(12) United States Patent
Veto et al.

(10) Patent No.: US 11,015,727 B2
(45) Date of Patent: May 25, 2021

(54) VALVES HAVING FLEXIBLE MEMBRANES

(71) Applicant: The Boeing Company, Chicago, IL (US)

(72) Inventors: Christopher C. Veto, Hawthorne, CA (US); Michael S. Karapetian, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 58 days.

(21) Appl. No.: 16/278,526

(22) Filed: Feb. 18, 2019

(65) Prior Publication Data
US 2020/0263796 A1 Aug. 20, 2020

(51) Int. Cl.
*F16K 15/14* (2006.01)
*F16K 31/126* (2006.01)

(52) U.S. Cl.
CPC ........ *F16K 15/147* (2013.01); *F16K 31/1266* (2013.01); *Y10T 137/788* (2015.04)

(58) Field of Classification Search
CPC ........... Y10T 137/7889; Y10T 137/788; Y10T 137/7882; Y10T 137/7838; F16K 15/147; F16K 31/1266
USPC .................................................. 137/844–847
See application file for complete search history.

(56) References Cited

U.S. PATENT DOCUMENTS

| | | | | |
|---|---|---|---|---|
| 670,794 A | * | 3/1901 | Lott ...................... | F16K 15/147 137/844 |
| 2,328,382 A | * | 8/1943 | Langdon ............... | F16K 15/147 137/218 |
| 2,594,525 A | * | 4/1952 | Walden ................. | F16K 15/147 137/850 |
| 2,605,784 A | * | 8/1952 | Snider ................... | F16K 15/147 137/846 |
| 2,662,724 A | * | 12/1953 | Kravagna ............. | F16K 15/147 137/847 |
| 3,060,882 A | * | 10/1962 | Peters .................... | B63B 13/02 114/185 |
| 3,822,720 A | * | 7/1974 | Souza .................... | F04B 43/08 137/846 |
| 3,967,645 A | * | 7/1976 | Gregory ................ | A61F 5/4405 137/846 |
| 4,308,885 A | * | 1/1982 | Geisseler ............. | F16K 15/147 137/460 |

(Continued)

FOREIGN PATENT DOCUMENTS

EP 1835210 A1 * 9/2007 ........... F16K 15/147

OTHER PUBLICATIONS

"Duckbill valves, How they workl" retrieved from [http://www.minivalve.com/htm/HWDV.htm] on Aug. 16, 2019, 2 pages.

*Primary Examiner* — Jessica Cahill
(74) *Attorney, Agent, or Firm* — Hanley, Flight & Zimmerman, LLC

(57) ABSTRACT

Fluid apparatus and related methods are disclosed. An example fluid apparatus includes a body defining a fluid flow path between an inlet and an outlet. A flow control member is positioned in the fluid flow path. The flow control member has a base pivotally coupled to an inner wall of the body defining the fluid flow path. The flow control member has an annular tip that is to flex between an open position to allow fluid flow through the fluid flow path and a closed position to prevent fluid flow through the fluid flow path.

21 Claims, 13 Drawing Sheets

(56) References Cited

U.S. PATENT DOCUMENTS

| | | | | |
|---|---|---|---|---|
| 4,486,122 A | * | 12/1984 | Arntyr | E04D 13/0409 405/157 |
| 4,535,819 A | * | 8/1985 | Atkinson | F16K 15/147 137/846 |
| 4,566,493 A | * | 1/1986 | Edwards | F16K 15/144 137/846 |
| 4,810,123 A | * | 3/1989 | Bruggeman | B05C 17/0308 137/846 |
| 5,010,925 A | * | 4/1991 | Atkinson | F16K 15/147 137/846 |
| 5,033,504 A | * | 7/1991 | Kallenbach | F16K 15/147 137/493.1 |
| 5,261,459 A | * | 11/1993 | Atkinson | A61M 39/24 137/846 |
| 5,924,452 A | * | 7/1999 | Szpara | A61M 39/24 137/844 |
| 7,243,676 B2 | | 7/2007 | Bailey | |
| 7,997,460 B2 | | 8/2011 | Pardes et al. | |
| 8,628,032 B2 | | 1/2014 | Feith et al. | |
| 8,662,104 B2 | | 3/2014 | Hansmann et al. | |
| 2003/0111122 A1 | * | 6/2003 | Horton | F16K 15/147 137/846 |
| 2003/0116197 A1 | * | 6/2003 | Taylor | F16K 15/185 137/522 |
| 2006/0118189 A1 | * | 6/2006 | Tekulve | A61M 39/22 137/846 |
| 2009/0159826 A1 | * | 6/2009 | Poulton | F16K 15/147 251/157 |
| 2011/0132474 A1 | * | 6/2011 | Reese | F16K 37/005 137/487.5 |
| 2013/0334452 A1 | * | 12/2013 | Morselli | F16K 15/147 251/331 |
| 2018/0142795 A1 | * | 5/2018 | Landi | B60C 29/04 |

* cited by examiner

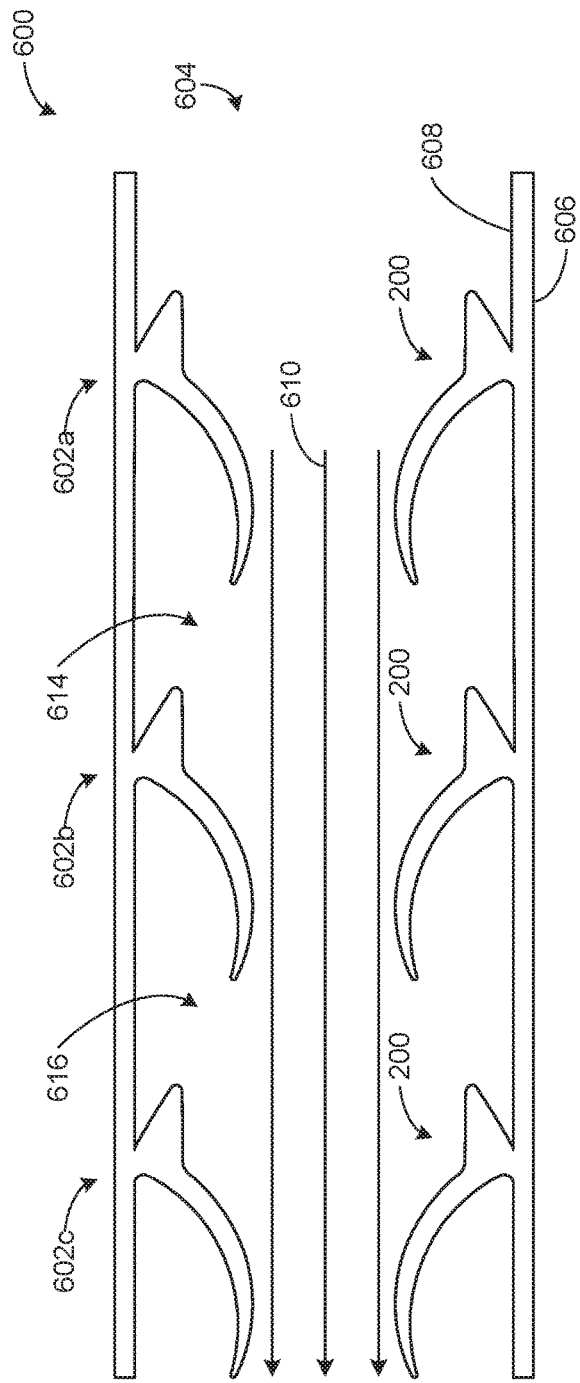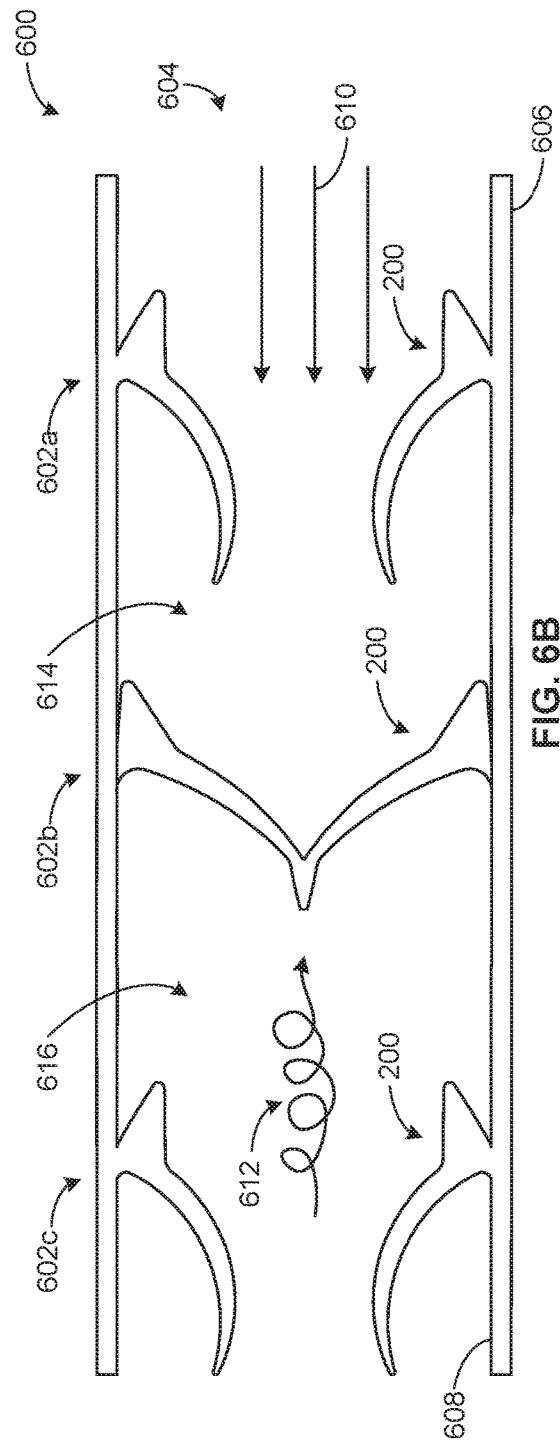
FIG. 6A
FIG. 6B

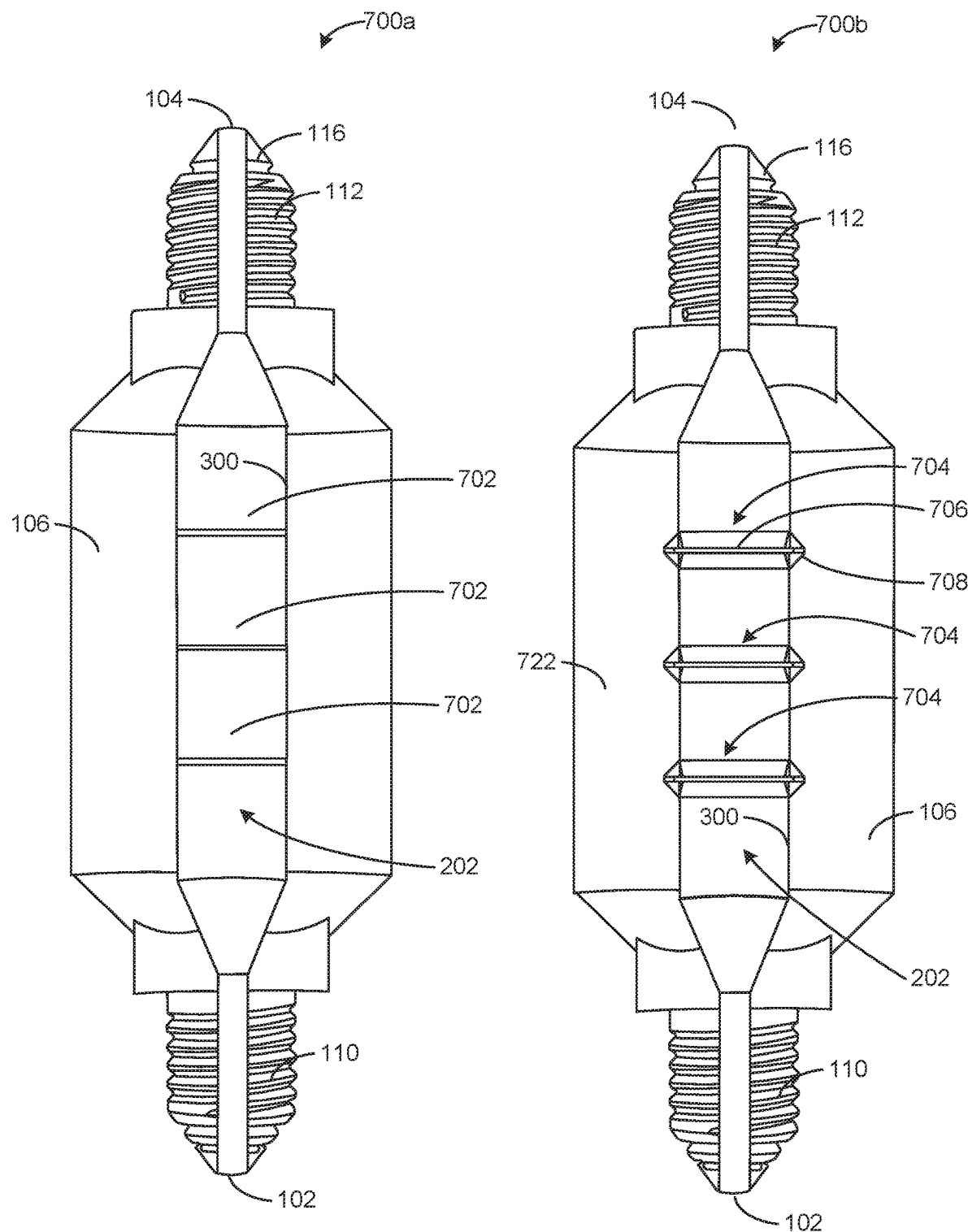

VALVES HAVING FLEXIBLE MEMBRANES

FIELD OF THE DISCLOSURE

This patent relates generally to fluid devices and, more particularly, to valves having flexible membranes.

BACKGROUND

Fluid systems (e.g., fuel systems, propulsion systems, hydraulic systems, etc.) often employ fluid devices (e.g., check valves, pressure relief valves, control valves, etc.) to control fluid flow (e.g., prevent reverse fluid flow) through the system. For example, a space shuttle propulsion system may employ check valves to prevent reverse fluid flow to a main engine. Some valves often employ movable components and/or mechanical hardware (e.g., a ball that moves relative to a valve seat) to control fluid flow through a flow path. For example, a spring is often employed to bias the movable component into sealing engagement with a valve seat. However, movable components and/or mechanical hardware can be prone to failure and/or corrosion. Thus, valves employing movable components and/or mechanical hardware can have a reduced operating life.

SUMMARY

An example fluid apparatus includes a fluid apparatus includes a body defining a fluid flow path between an inlet and an outlet. A flow control member is positioned in the fluid flow path. The flow control member has a base pivotally coupled to an inner wall of the body defining the fluid flow path. The flow control member has an annular tip that is to flex between an open position to allow fluid flow through the fluid flow path and a closed position to prevent fluid flow through the fluid flow path.

Another example fluid apparatus includes a housing defining a fluid flow path having an inlet and an outlet. A flow control member is positioned in the fluid flow path. The flow control member has a membrane configured to flex between an open position to allow fluid flow across the flow control member and a closed position to at least one of restrict or prevent fluid flow across the flow control member. The membrane is configured to provide an opening that is substantially circular when the membrane is in the open position.

Another example fluid apparatus includes a flexible membrane positioned in a fluid flow path. The flexible membrane includes a membrane body defining a tip and a base. A sleeve is coupled to the membrane body via the base, the base defining an annular transition to enable the membrane body to pivot relative to the sleeve to move the flexible membrane between an open position to allow fluid flow through the fluid apparatus and a closed position to prevent fluid flow through the fluid apparatus.

BRIEF DESCRIPTION OF THE DRAWINGS

FIG. 6A is a cross-sectional view of another example fluid apparatus disclosed herein that includes a plurality of example flow control members within a fluid flow passageway of the example fluid apparatus.

FIG. 6B is a cross-sectional view of the example fluid apparatus of FIG. 6A that includes a plurality of example flow control members experiencing water hammer within a fluid flow passageway of the example fluid apparatus.

FIG. 7A is a partial cutaway view of another example fluid apparatus disclosed herein that includes example disk-shaped flow control members.

FIG. 7B is a partial cutaway view of another example fluid apparatus disclosed herein that includes other example disk-shaped flow control members.

Figure 1:
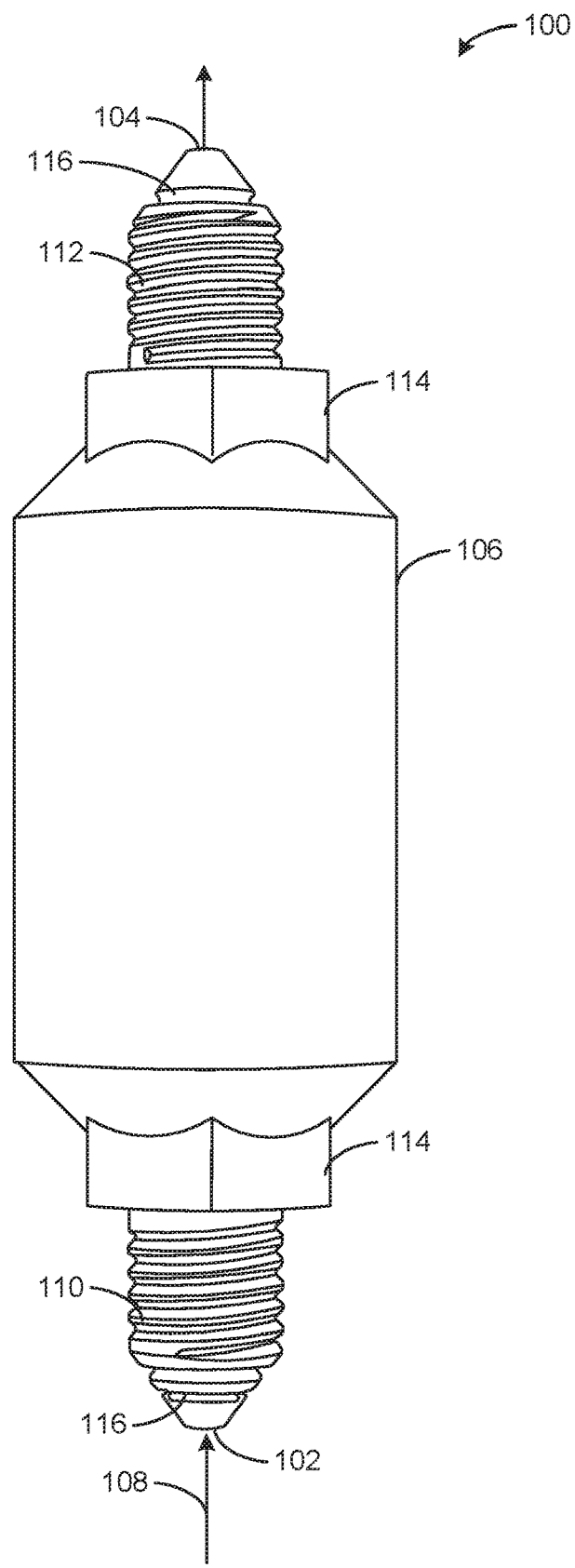
FIG. 1 is an example fluid apparatus in accordance with the teachings of this disclosure.

Wherever possible, the same reference numbers will be used throughout the drawing(s) and accompanying written description to refer to the same or like parts. As used in this description, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in direct contact with another part means that there is no intermediate part between the two parts.

DETAILED DESCRIPTION

Fluid control valves (e.g., check valves, pressure relief valves, control valves, etc.) are used in various industries to control or regulate fluid flow needs of fluid process systems. However, some known fluid flow devices (e.g., check valves) have limited life due to fatigue and/or wear on internal mechanisms and/or seals. For example, some known fluid control devices can become damaged more easily and/or may be prone to higher rates of failure due to irregularities in fluid flow, high pressure applications, and/or high temperature applications, etc. In some instances, multiple fluid control devices are used in a fluid process system to provide safety and/or redundancy, which can increase weight and/or costs of some systems.

For example, some known check valves employ a spring-biased swing flapper. However, in some applications, fluid flow may cause cyclic wear on the spring and/or flapper due to spring-flapper oscillations. In some examples, a springless or spring-free valve (e.g., a check valve) employs a flexible flap (e.g., an umbrella valve, springless flapper valve, etc.) that moves or deflects relative to a valve seat to control fluid flow. In some instances, the flaps could chatter and/or become damaged during high vibrational applications. Thus, the flap may be subject to chatter during certain flow conditions that prevent the flap from providing a desired shut-off or seal.

Additionally, some known check valves include a flexible flow control member having a duck-bill shape to provide unidirectional fluid flow. Such duck-bill check valves create an oval-shaped or oblong orifice (e.g., an opening) when fluid flows in a desired direction (e.g., when the duck-bill valve moves to an open position to allow fluid flow through the valve). However, the oval-shaped or oblong opening of the duck-bill check valves can create turbulent flow (e.g., downstream from the duck-bill check valve or through the orifice) due to a shape of the orifice provided by the duckbill valve. In some instances, the turbulent flow exiting the duck-bill check valve can cause cavitation, head loss, etc. Further, when a duck-bill check valve is in a closed position, the duck-bill check valve may not seal properly along the edges (e.g., side or peripheral edges) of the valve, causing fluid leakage when the duck-bill check valve is in a closed position. Such fluid leakage can significantly reduce a rating or classification (e.g., a shut-off rating) of the valve.

Example fluid apparatus disclosed herein can be employed with process control systems to control fluid flow. In some examples, example fluid apparatus disclosed herein allow for unidirectional fluid flow when fluid flows through the fluid apparatus in a desired direction. For example, fluid apparatus disclosed herein can be configured as check valves to prevent reverse fluid flow through a fluid control system (e.g., a fuel system, a hydraulic system, etc.). Specifically, example fluid apparatus disclosed herein eliminate the need for internal mechanisms (e.g., springs, flappers, hinges, seals, etc.) used in known valves (e.g., check valves) to shut off fluid flow in a fluid flow passageway (e.g., a fluid flow passageway of a pipe).

To control fluid flow, example fluid apparatus disclosed herein include one or more flexible membranes. For example, fluid apparatus disclosed herein include a unitary flexible membrane (e.g., a curved membrane or flow control member) having a variable stiffness that moves (e.g., flexes, bends, etc.) between a closed position to prevent fluid flow and an open position to allow the flow of fluid through a fluid flow passageway. Specifically, an end or peripheral edge of the flexible membrane seals against itself to prevent or restrict fluid flow through a fluid flow passageway of the fluid apparatus when the fluid apparatus is in a closed position. Additionally, example fluid devices disclosed herein are configured to provide laminar fluid flow characteristics through an orifice of a fluid flow passageway when the fluid apparatus is in an open position. For example, some flexible membranes disclosed herein define an orifice having a circular or conical opening to produce laminar flow through the fluid apparatus. The laminar flow characteristics provided by the example fluid apparatus disclosed herein reduces and/or eliminates problems (e.g., cavitation, head loss, etc.) with known check valves having an elliptical or oblong shaped opening (e.g., duck-bill shaped valves) that produce turbulent fluid flow characteristics.

Example fluid apparatus disclosed herein are less susceptible to failure than known valves because the example fluid apparatus disclosed herein include fewer moving parts (e.g., no separate moving parts). Thus, example fluid apparatus disclosed herein eliminate internal components such as, for example, a central poppet or ball, a spring, an actuator, etc., used in known fluid devices (e.g., check valves). Because the flexible membrane is a single piece or unitary structure and does not include moving parts (e.g., a ball, a poppet, a flapper, etc.), the flexible curved membrane has fewer points of weakness and, thus, has a reduced likelihood of failure compared to known fluid valves. For example, the fluid apparatus disclosed herein do not include screws, welds, shafts, springs, etc., that are more susceptible to failure than the membranes of the fluid apparatus disclosed herein. In some instances, example fluid apparatus disclosed herein allow the fluid apparatus to maintain constant cracking pressure during vibration of the fluid apparatus and/or during other harsh environments (e.g., high g-force loading, high number of cycles, etc.) due to the design of the fluid apparatus (e.g., having no moving parts).

Further, example fluid apparatus disclosed herein are lighter than known check valves due to the materials used and/or due to the fluid apparatus having no separate moving parts (e.g., only parts integral to the device move) and, thus, are more adaptable to stringent design requirements. For example, example fluid apparatus disclosed herein employ a membrane having variable shape and/or stiffness characteristics, allowing the membrane to be modified to meet specification requirements of a wide range of applications. The example fluid apparatus disclosed herein may be configured to operate with various different types of fluids (e.g., fuel, hydraulic fluid, oil, solvents, water, waste water, etc.), a wide range of viscosities, a wide range of pressures, and a wide range of flow rates because of the adaptability of the membrane design (dimensional characteristics) and/or stiffness characteristics. For example, a flexible membrane disclosed herein can have a stiffness that varies across a body (e.g., a diameter) of the flexible membrane. The variable stiffness enables an example flexible membrane for use with a wide range of pressures. Additionally, example fluid apparatus disclosed herein are more responsive to changes in fluid flow direction and/or flow rate (e.g., close quicker to prevent reverse flow), thereby improving (e.g., decreasing) a response time of example fluid apparatus to prevent fluid from moving in an undesired direction. In some examples disclosed herein, fluid apparatus include a plurality of flexible membranes positioned in series (e.g., to further prevent flow in the reverse direction). In some examples, the flexible membranes are spaced along a longitudinal axis of the fluid apparatus. In some examples, the flexible membranes spaced along the longitudinal axis of the fluid apparatus can be configured to provide different or varying cracking pressure characteristic(s) and/or provide redundant sealing capabilities.

In some instances, fluid devices disclosed herein provide dampening characteristics. For example, fluid devices disclosed herein can be employed in systems that experience fluid hammer (e.g., hammer shock, hydraulic hammer, etc.). Specifically, example fluid apparatus disclosed herein may prevent damage caused by fluid hammer that may occur in a pipeline or any other system carrying fluid. For example, fluid hammer is a pressure surge or wave caused when a fluid (e.g., a liquid such as oil, water, etc.) in motion within a pipe or other fluid passageway has a sudden change of momentum (e.g., fluid is forced to stop or change directions suddenly when a valve is closed). This phenomena commonly occurs when a valve closes suddenly at an end of a pipeline system, and a pressure wave propagates in the pipe. Such a pressure wave can cause noise and/or vibration that can lead to pipe collapse. To reduce the effects of fluid hammer, systems often employ tanks, accumulators, surge tanks, blow-off valves, and/or other fluid components. However, such components add weight, costs and complexity to fluid systems, whish increases costs and reduces efficiency. The examples disclosed herein can, in some examples, act to dampen the pressure wave propagating through the pipe, thus reducing or eliminating the negative effects of water hammer. For example, as the pressure wave moves through the pipe (e.g., in a direction opposite the direction of fluid flow), the fluid apparatus disclosed herein closes and dampens or dissipates the pressure wave in the pipe, acting as a shock absorber within the pipe. The dampening or dissipation of the pressure wave in the pipe prevents the pressure wave from continuing to propagate through the pipe and causing damage to the pipeline system or other system. In some instances, example fluid apparatus disclosed herein further allow the fluid apparatus to maintain constant cracking pressure during vibration of the fluid apparatus.

Example fluid apparatus disclosed herein can be manufactured via additive manufacturing to meet design requirements for use in a wide range of applications. For example, the fluid apparatus may be manufactured using additive manufacturing methods and/or printers, such as VAT photopolymerization, powder bed fusion, etc. Alternatively, the fluid apparatus disclosed herein can be manufactured using a drop-in additive manufacturing process, wherein a previously fabricated component (e.g., a flow control member) can be inserted or positioned adjacent to a component that is partially manufactured. In some examples, one or more components of fluid apparatus disclosed herein can be manufactured via injection molding, casting, machining, additive manufacturing, any combination thereof, and/or any other manufacturing process(es).

Example fluid apparatus disclosed herein may be employed with aerospace applications or systems (e.g., a spacecraft, an aircraft, a space station system), automotive applications or systems, industrial systems, applications having cryogenic conditions, medical applications and/or any other application or system requiring fluid flow control (e.g., prevention of reverse fluid flow). For example, fluid apparatus disclosed herein may be employed in propulsion systems (e.g., a rocket or spacecraft propulsion system), fuel systems (e.g., an automotive fuel system), hydraulic systems, and/or any other process or system requiring fluid flow control (e.g., prevention of reverse fluid flow). Examples disclosed herein may further be used in intravenous (IV) tubes to prevent reverse flow in the IV tube and/or other medical applications. In some examples, the fluid apparatus can be included in a portion of a space shuttle main propulsion system and/or another re-entry vehicle.

FIG. 1 is an example fluid apparatus 100 in accordance with the teachings of this disclosure. The fluid apparatus 100 of the illustrated example is a valve (e.g., a check valve, a burst valve, etc.) that enables (e.g., one-way) fluid flow between an inlet 102 and an outlet 104 defined by a housing 106 (e.g., a cylindrical valve body or housing) of the fluid apparatus 100. The fluid apparatus 100 of the illustrated example prevents fluid flow from a downstream source (e.g., a bleed return line of a spacecraft propulsion system) fluidly coupled to the outlet 104 toward an upstream source connected to the inlet 102. In the illustrated example, fluid flows through the fluid apparatus 100 in a flow direction 108 from the inlet 102 toward the outlet 104. Thus, the fluid apparatus 100 prevents fluid flow that is opposite the flow direction 108. The housing 106 of the illustrated example includes a first fitting 110 defining the inlet 102 and a second fitting 112 defining the outlet 104. The first and second fittings 110, 112 of the illustrated example are male fittings having threaded ends. The housing 106 includes tool-engaging surfaces 114 adjacent the first and second fittings 110, 112 to facilitate coupling/decoupling of the fluid apparatus 100 with another fluid apparatus and/or fluid process system(s). The first and second fittings 110, 112 include seal glands or grooves 116 to receive a seal (e.g., an O-ring) to provide a seal to the fluid apparatus 100 when the fluid apparatus 100 is coupled to another apparatus (e.g., another fluid apparatus, a pipe, etc.).

Figure 2:
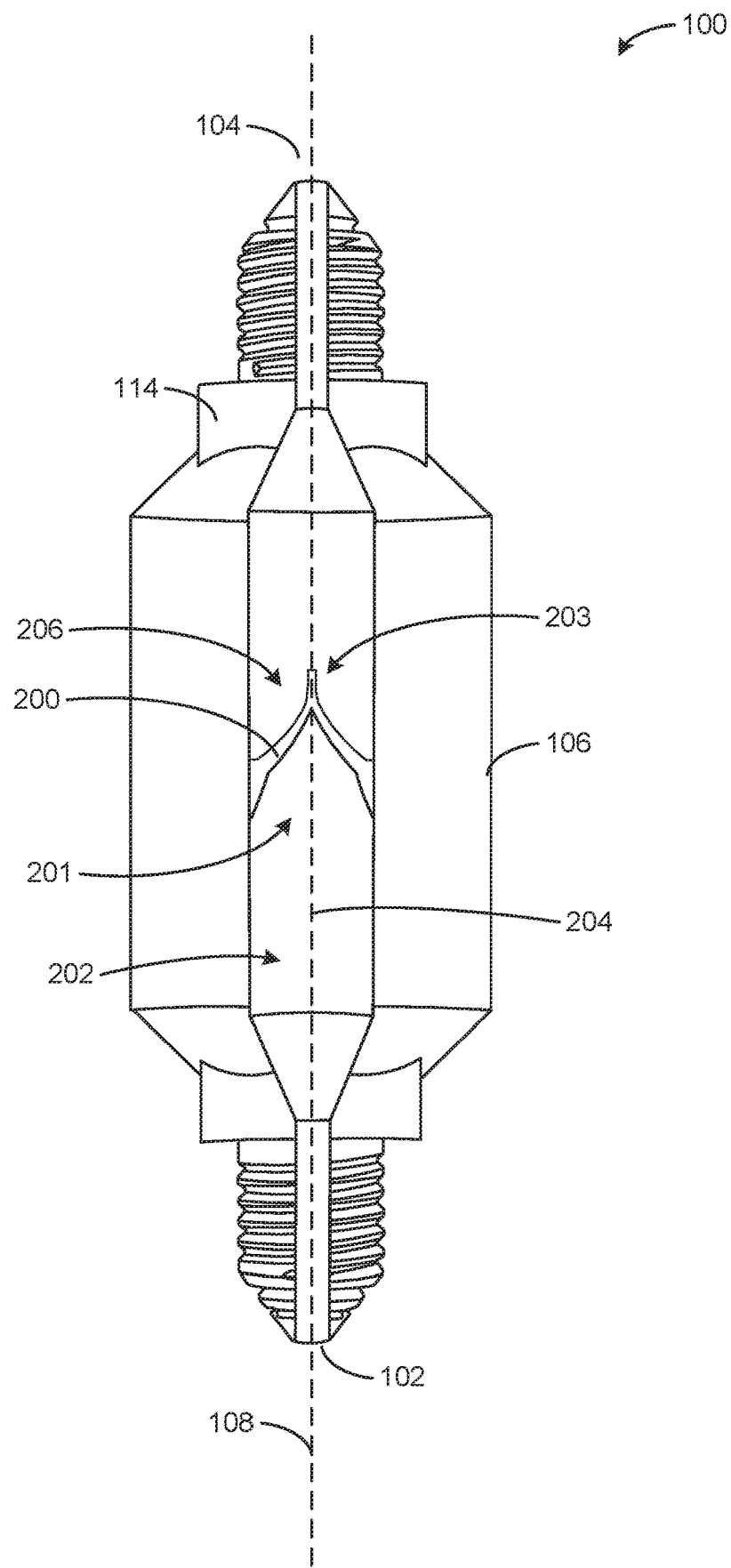
FIG. 2 is a cutaway view of the example fluid apparatus of FIG. 1.

FIG. 2 is a cutaway view of the example fluid apparatus 100 of FIG. 1. The fluid apparatus 100 includes an example flow control member 200 positioned in a fluid flow passageway 202 (e.g., an axial fluid flow path) defined by the housing 106 of the fluid apparatus 100 between the inlet 102 and the outlet 104. For example, the flow control member 200 has a first side 201 oriented toward the inlet 102 and a second side 203 opposite the first side 201 oriented toward the outlet 104. The inlet 102 of the illustrated example is coaxially aligned with the outlet 104. Additionally, the inlet 102 and the outlet 104 of the illustrated example are coaxially aligned relative to a longitudinal axis 204 of the fluid apparatus 100 and/or the fluid flow passageway 202. In some examples, the inlet 102 may not be coaxially aligned with the outlet 104 and/or the longitudinal axis 204. In some examples, the fluid flow passageway 202 (e.g., a longitudinal axis of the fluid flow passageway 202) can be offset (e.g., not aligned) relative to the inlet 102 and/or the outlet 104.

The flow control member 200 controls fluid flow between the inlet 102 and the outlet 104 based on a pressure differential across the flow control member 200. For example, the fluid apparatus 100 is a normally closed valve. The flow control member 200 can be configured to move between an open position (e.g., an open position 302 of FIG. 3B) to allow fluid flow through the fluid flow passageway 202 when a pressure of the fluid at the inlet 102 (e.g., the first side 201 of the flow control member 200) exceeds a set pressure (e.g., is greater than a cracking pressure) of the flow control member 200 and moves to the closed position 206 when a pressure at the inlet 102 does not exceed (e.g., is less than the cracking pressure) of the flow control member 200. For instance, the flow control member 200 moves to the closed position 206 when fluid is not flowing through the fluid flow passageway 202 from the inlet 102 to the outlet 104 and moves to an open position when fluid flows through the fluid flow passageway 202 from the inlet 102 to the outlet 104 (e.g., fluid flow in the flow direction 108). In some instances, the flow control member 200 moves to the closed position 206 when fluid flow moves in a reverse direction (e.g., a direction opposite the flow direction 108, a pressure of the fluid at the outlet 104 is greater than the pressure of the fluid at the inlet 102, etc.). In such examples, the flow control member 200 prevents the flow of fluid from the outlet 104 toward the inlet 102.

Figure 3A:
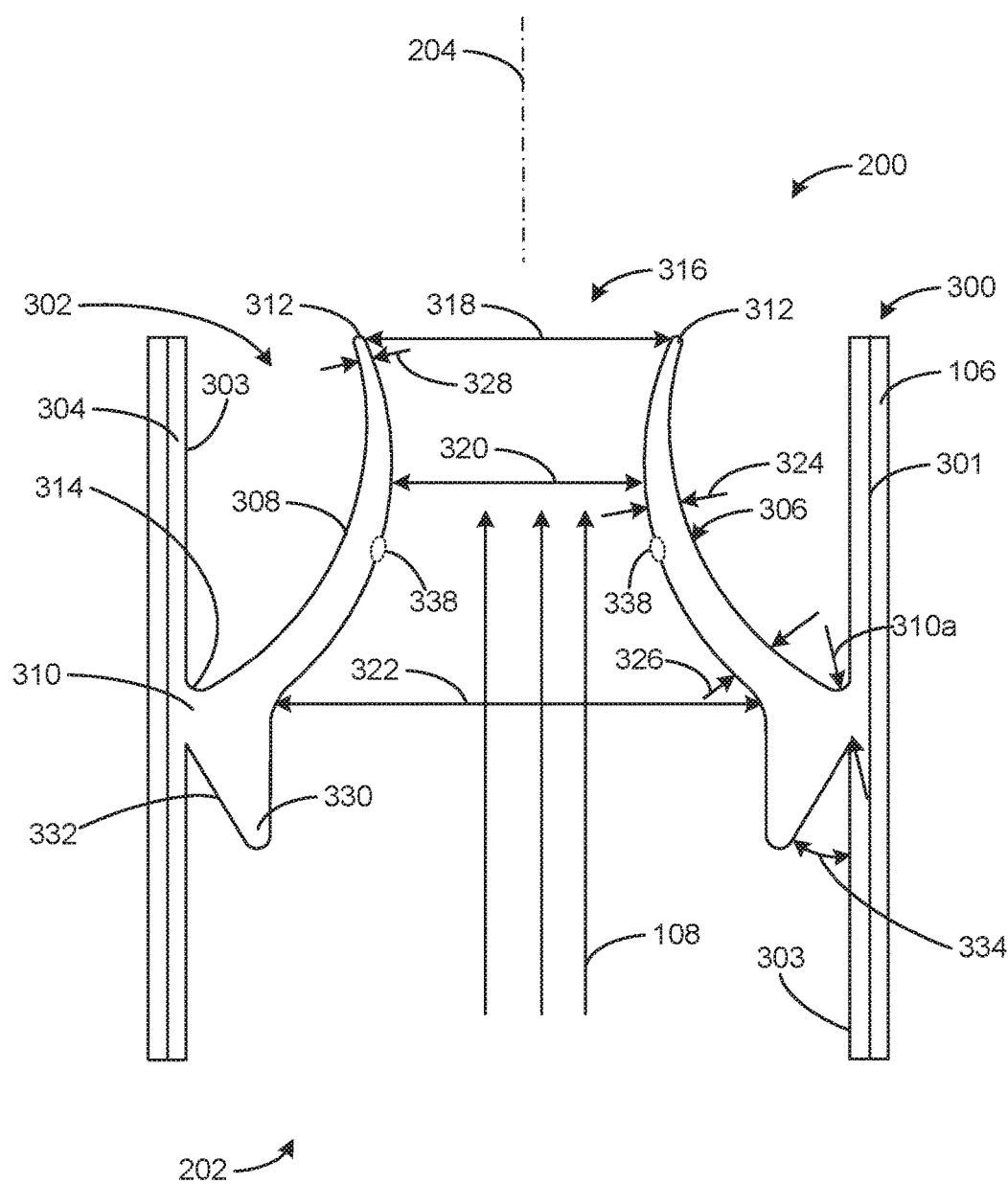
FIG. 3A is a partial, cross-sectional view of a portion of the example fluid apparatus of FIGS. 1 and 2 shown in an example open position.
Figure 3B:
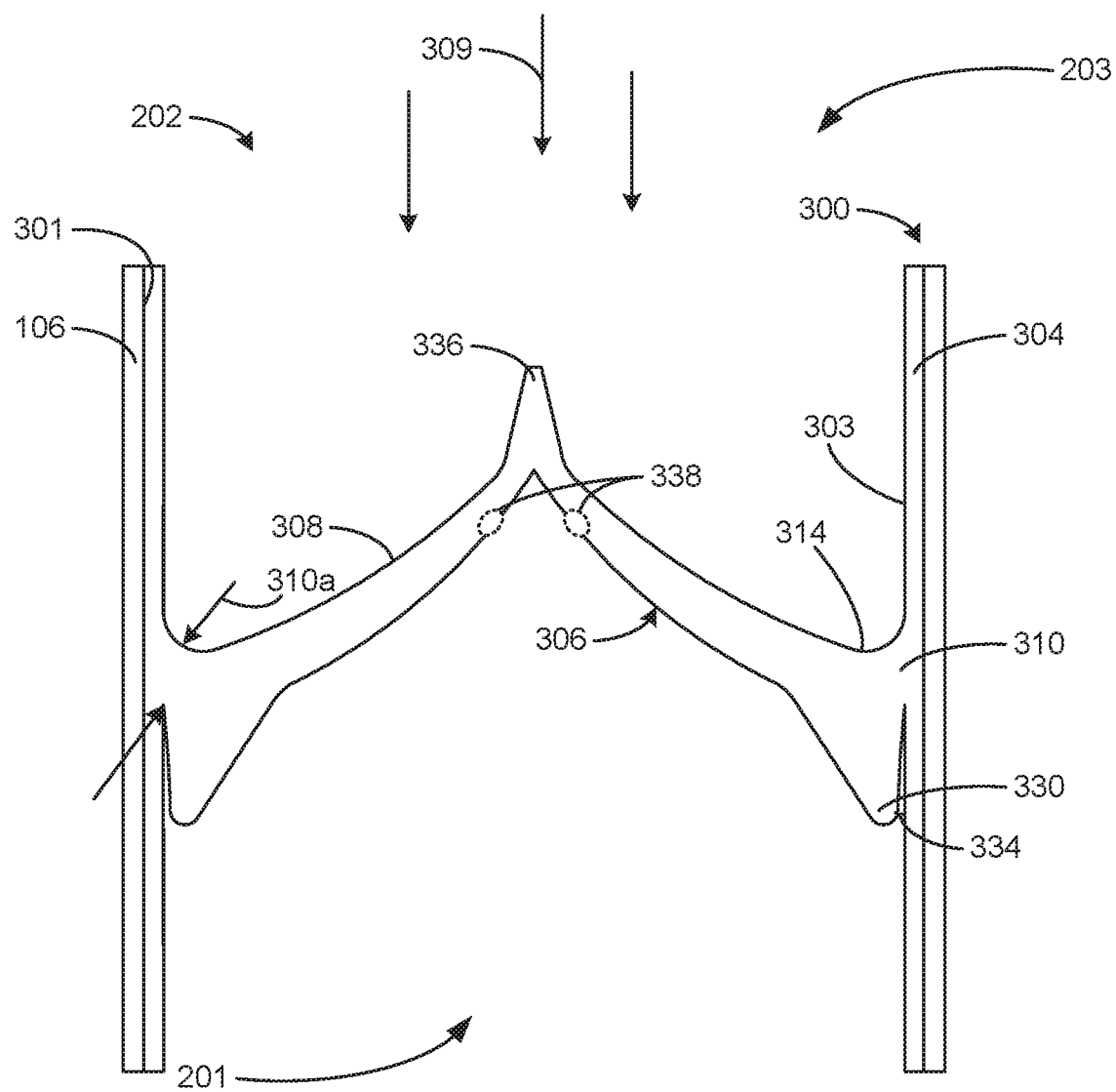
FIG. 3B is a partial, cross-sectional view of a portion of the example fluid apparatus of FIGS. 1 and 2 shown in an example closed position.

FIGS. 3A and 3B are partial, cross-sectional views of the example fluid apparatus 100 of FIGS. 1 and 2. FIG. 3A illustrates the flow control member 200 in an example open position 302. FIG. 3B illustrates the example flow control member 200 in the example closed position 206.

The flow control member 200 of the illustrated example pivots between the open position 302 and the closed position 206 relative to a body 300 that defines (e.g., at least a portion of) the fluid flow path 206. The flow control member 200 of the illustrated example is pivotally coupled to an inner surface 303 of the body 300. The body 300 of the illustrated example includes a sleeve 304 and the housing 106. Thus, in the illustrated example, the sleeve 304 defines the inner surface 303 and the flow control member 200 is pivotally coupled (e.g., directly) to the sleeve 304. However, in some examples, the sleeve 304 may not be included and an inner surface 301 of the housing 106 defines the fluid flow passageway 202 (e.g., the inner surface 303). In some such examples, the housing 106 defines the body 300 and the flow control member 200 is pivotally coupled (e.g., directly) to the inner surface 301 of the housing 106.

Referring to FIG. 3A, the example flow control member 200 includes the sleeve 304 and a membrane 306. The sleeve 304 (e.g., an annular wall or insert) is in contact with the housing 106 (e.g., a valve body). For example, the sleeve 304 lines (e.g., directly engages) the inner surface 301 (e.g., an annular wall, a wall, etc.) of the housing 106. The membrane 306 includes a membrane body 308 (e.g., a central portion) pivotally coupled to the sleeve 304 via a base 310. The base 310 of the illustrated example is an annular wall and couples the membrane body 308 to the sleeve 304. Additionally, the base 310 prevents the membrane body 308 from shearing from the sleeve 304 during operation (e.g., due to high-pressure process fluids). For example, the base 310 has a thickness 310a that is capable of withstanding shearing forces exerted on the flow control member 200 when fluid flows in the fluid flow passageway 202.

The membrane 306 extends from the base 310 (e.g., an annular base) toward a center of the fluid flow passageway 202. The membrane body 308 of the illustrated example extends in a curvilinear or arcuate manner from the base 310. For example, the membrane body 308 includes a profile having a conical shape with curved walls. Each of the curved walls extends outwardly away from the base 310 (e.g., generally upward in the orientation of FIG. 3A), toward the longitudinal axis 204, and toward an annular tip 312 of the membrane body 308. In the illustrated example, the membrane body 308 pivots and/or flexes relative to the sleeve 304 at a transition 314 (e.g., an annular wall) provided by or defined by the base 310. For example, the transition 314 is pivotally coupled to the inner surface 303 of the body 300 (e.g., the sleeve 304). In some examples, the transition 314 can be coupled to the inner surface 301 of the housing 106. In some examples, at least some portions of the transition 314 and/or the membrane 306 elongate (e.g., stretch) and/or compress when the membrane 306 pivots about the sleeve 304 to move to the open position 302. As the membrane body 308 pivots and/or flexes at the transition 314, the annular tip 312 flexes, deflects or otherwise moves between the closed position 206, as shown in FIG. 2 and/or 3B, and the open position 302, as shown in FIG. 3A.

In the open position 302 shown in FIG. 3A, the annular tip 312 forms an opening or orifice 316 (e.g., an oculus) having a circular shape (e.g., an annular opening). Additionally, the orifice 316 has a varying diameter between the base 310 and the annular tip 312. For example, in the open position 302, the membrane body 308 pivots relative to the sleeve 304 and the annular tip 312 pivots or deflects radially outwardly away from the longitudinal axis 204 and toward the sleeve 304. In some examples, the tip 312 deflects relative to the membrane body 308 to define the orifice 316 of the fluid flow passageway 202. Thus, the annular tip 312 can continue to flex relative to the membrane body 308 toward the sleeve 304 (e.g., toward the open position) when the membrane body 308 and/or the base 310 can no longer pivot relative to the sleeve 304.

In the open position 302, the annular tip 312 has a first dimension 318 (e.g., a first diameter) that is greater than a second dimension 320 (e.g., a second diameter) of the membrane body 308 measured between the base 310 and the annular tip 312, and a third dimension 322 (e.g., a third diameter) of the base 310 is greater than the second dimension 320 of the membrane body 308. In other words, the membrane 306 flexes and/or pivots relative to the sleeve 304 via the base 310 and/or the annular tip 312 moves or deflects relative to the membrane body 308 such that the second dimension 320 defining a portion of the orifice 316 between the annular tip 312 and the base 310 is smaller than the first dimension 318 of the orifice 316 at the annular tip 312 and the third dimension 322 defining a portion of the orifice 316 at the base 310 even though the membrane body 308 is positioned between the annular tip 312 and the base 310. The difference between the first dimension 318 and the second dimension 320 is provided by the curved and/or arcuate shape of the membrane body 308.

To vary or adjust (e.g., increase or decrease) performance characteristic(s) or parameter(s) of the fluid apparatus 100, the membrane 306 of the illustrated example can be formed with different materials, various dimensional characteristic(s), variable stiffness characteristics, cracking pressures, response time sensitivity, etc. For example, the membrane 306 can have variable stiffness characteristics between the base 310 and the annular tip 312. For example, the membrane body 308 can have a higher stiffness characteristic at the base 310 and a lower stiffness characteristic at the annular tip 312. In some examples, the stiffness characteristic(s) of the membrane body 308 gradually varies (e.g., increases or decreases linearly, exponentially etc.) between the base 310 and the annular tip 312. In such examples, the variable stiffness characteristic(s) of the membrane body 308 enables the flow control member 200 to operate in applications having a wide range of pressures, temperatures and/or other process fluid conditions or characteristics. Alternatively, the stiffness characteristic(s) of the membrane body 308 can be constant along a length of the membrane body 308.

Additionally, or alternatively, a thickness 324 (e.g., a cross-sectional thickness) of the membrane 306 between the base 310 and the tip 312 can be adjusted (e.g., increased or decreased) to adjust (e.g., increase or decrease) a cracking pressure (e.g., pre-set pressure) of the flow control member 200. For example, increasing the thickness of the membrane body 308 can increase a cracking pressure, while decreasing the thickness of the membrane body 308 can decrease the cracking pressure of the flow control member 200.

Additionally, to increase a response time or sensitivity of the flow control member 200, the membrane body 308 can be formed with a variable thickness 324 between the base 310 and the annular tip 312. For example, the membrane body 308 has a first thickness 326 at the base 310 and a second thickness 328 at the tip 312, where the thickness 324 decreases (e.g., gradually, linearly, exponentially, etc.) from the base 310 to the tip 312. The variable thickness of the membrane body 308 allows the flow control member 200 to increase a speed at which the flow control member 200 moves between the open position 302 and the closed position 206 to control fluid flow in the fluid flow passageway 202.

In some examples, the increased closing speed enables the flow control member 200 to react faster to changes in the direction of fluid flow in the fluid flow passageway 202 than, for example, conventional valves or check valves. For example, if flow changes from the flow direction 108 to a direction opposite the flow direction 108, the flow control member 200 can move from the open position 302 to the closed position 206 (e.g., approximately between 0.7 and 300 milliseconds) to prevent fluid from flowing in the direction opposite the flow direction 108. Additionally, in some examples, the flow control member 200 closes quicker than conventional valves or check valves when fluid flow in the fluid flow passageway 202 stops flowing from the inlet 102. In such examples, the quick closure of the flow control member 200 prevents debris, contaminants, and/or unwanted fluid from passing through the fluid flow passageway 202.

To prevent the tip 312 and/or the membrane body 308 from inverting (e.g., moving toward the inlet 102) when the flow control member 200 is in the closed position 206, the membrane 306 of the illustrated example includes a stop 330. The stop 330 of the illustrated example is coupled to or defined by the base 310. For example, the stop 330 is integrally formed with the base 310 and/or the membrane body 308 and extends in a direction away from the base 310 and the annular tip 312. The stop 330 moves relative to (e.g., the inner surface 303 of) the body 300 (e.g., the sleeve 304) when the membrane 306 moves between the open position 302 and the closed position 206. For example, the stop 330 includes a stop engaging surface 332 that moves toward (e.g., into engagement with) and away from (e.g., disengages from) the body 300 (e.g., the sleeve 304 and/or the housing 106) when the membrane 306 moves between the open position 302 and the closed position 206. Specifically, the stop engaging surface 332 is generally oriented toward the inner surface 303 of the body 300 (e.g., the sleeve 304 and/or of the housing 106). For example, when the flow control member 200 moves from the closed position 206 to the open position 302, the stop engaging surface 332 of the stop 330 moves away from the body 300 (e.g., the sleeve 304 and/or the housing 106) such that the stop engaging surface 332 does not engage the body 300 (e.g., the sleeve 304 and/or the housing 106). Alternatively, when the flow control member 200 moves from the open position 302 to the closed position 206, the stop engaging surface 332 of the stop 330 moves toward the body 300 (e.g., the sleeve 304 and/or the housing 106). In the illustrated example, the stop 330 directly engages the inner surface 303 of the sleeve 304 (i.e., or the inner surface 301 of the housing 106 when the sleeve 304 is omitted) to prevent further rotation of the membrane 306 relative to the body 300 when the flow control member 200 is in the closed position 206. For example, a gap angle 334 measured between the stop 330 (e.g., the stop engaging surface 332) and the body 300 (e.g., the sleeve 304) changes (e.g., increases or decreases) as the flow control member 200 rotates between the closed position 206 and the open position 302. For example, when the flow control member 200 is in the open position 302, the gap angle 334 is at or near a maximum value (e.g., between 10 degrees and 40 degrees). Alternatively, when the flow control member 200 is in the closed position 206 (e.g., as shown in FIG. 3B), the gap angle 334 is at or near a minimum value (e.g., between zero and 5 degrees). In some examples, the gap angle 334 is eliminated or reduced such that at least a portion of the stop engaging surface 332 of the stop 330 is in direct contact with the body 300, thereby preventing the flow control member 200 from inverting (i.e., prevents the tip 312 from moving closer to the inlet 102 than the base 310 and/or the stop 330 when the valve is in the closed position 206). For example, the body 300 prevents the annular tip 312 from inverting when the annular tip 312 is in the closed position 206. For example, the annular tip 312 from rotating in a direction opposite the flow direction 108 (e.g., toward the inlet 102) to prevent the annular tip 312 from forming an opening that allows fluid to flow in a direction opposite the flow direction 108 (e.g., from the outlet 104 to the inlet 102) when the stop 330 engages the body 300. Additionally, in the illustrated example, the annular tip 312 is coaxially aligned with a longitudinal axis 204 of the fluid flow path 202 when the annular tip 312 is in the open position 302 and when the annular tip 312 is in the closed position 206.

Referring to FIG. 3B, in the closed position 206, the annular tip 312 of the flow control member 200 forms a point 336 to prevent fluid flow through the fluid flow passageway 202. To move the membrane 306 to the closed position 206, pressurized fluid at the inlet 102 can be reduced to a pressure that causes the membrane body 308 to transform to the closed position 206 (e.g., a pressure that is less than the cracking pressure of the membrane 306). For example, when the membrane body 308 transforms from the open position 302 to the closed position 206, and the annular tip 312 is compressed in such a way so as to prevent fluid flow through the orifice 316. In some examples, to transform the membrane body 308 from the open position 302 to the closed position 206 (and vice versa), one or more of radial slopes, a stress, a reaction moment, and/or height of the membrane body 308 and/or the of the membrane 306 can be reduced. In some examples, as the membrane body 308 transforms from the open position 302, with an oculus that enables fluid flow, to the closed position 206 where such opening or orifice 316 is tightly compressed or collapses to prevent fluid flow through the membrane 306. In some examples, the membrane body 308 exhibits a variety of shapes during the transformation from the open position 302 to the closed position 206. In some such examples, each of the numerous shapes of the membrane body 308 can be characterized by one or more Zernike polynomials. In some examples, when fluid is not flowing in the fluid flow passageway 202, the flow control member 200 moves to the closed position 206 (e.g., the closed position 206 is a resting or natural position for the flow control member 200). In such examples, the transition 314 is constructed in such a way as to naturally flex or position the membrane body 308 toward a center of the fluid flow passageway 202 (e.g., the flow control member 200 naturally bends or flexes toward the closed position 206). For example, when little or no pressure is applied to the first side 201 of the membrane body 308 (e.g., no fluid flows in the fluid flow passageway 202), the transition 314 can bend toward the center of the fluid flow passageway 202, closing the orifice 316 created by the annular tip 312. As pressure is exerted on the first side 201 of the flow control member 200 in the flow direction 108 (e.g., allowing rotation of the membrane body 308), the transition 314 can flex in the flow direction 108, opening the annular tip 312 to form the orifice 316 (e.g., an annular opening) through which fluid can flow as shown, for example, in FIG. 3A.

In some examples, a reverse fluid flow or pressure causes the membrane 306 to move to the closed position 206. As the fluid flows in a reverse flow direction 309, the membrane 306 moves to the closed position 206 when the fluid in the reverse flow direction 309 exerts a pressure on the second side 203 of the flow control member 200 that is greater than a pressure exerted on the first side 201 of the flow control member 200 by the fluid at the inlet 102 (e.g., creating a downward force in the orientation of FIG. 3B). Additionally, engagement between the stop 330 and the sleeve 304 prevents pressurized fluid at the outlet 104 from inverting the membrane body 308. For example, when the stop 330 engages the sleeve 304, the flow control member 200 cannot continue rotating about the base 310 even with the applied pressure acting on the flow control member 200. To the contrary, the stop 330 imparts a reactive force to the tip 312 that prevents the tip 312 from inverting when the stop 330 engages the body 300. In such an example, the gap angle 334 is effectively zero (e.g., because the stop 330 is in engagement with the body 300 and/or the sleeve 304). The flow control member 200 of the illustrated example remains in the closed position 206, as shown in FIG. 3B, until fluid begins to flow in the flow direction 108 and/or a pressure differential across the membrane 306 is such that the pressure at the first side 201 of the membrane 306 (e.g., at the inlet 102) is greater than the pressure at the second side 203 of the membrane 306 (e.g., at the outlet 104), and such pressure differential is greater than the cracking pressure of the membrane 306.

To obtain data associated with the flow control member 200 during operation of the flow control member 200, the flow control member 200 includes one or more sensors 338. The sensors 338 can be embedded, overmolded or otherwise coupled (e.g., attached) to the membrane body 308. In some examples, electrical wiring to provide power to the sensors 338 can be embedded in the membrane body 308, the base 310, and/or the body 300 (e.g., the sleeve 304 and/or the housing 106). In some such examples, the sensors 338 monitor movement and/or provided signals (e.g., binary or analog signals) to determine a position (e.g., the open position 302 and the closed position 206) of the flow control member 200. In some instances, data provided by the sensors 338 can be monitored in real-time to determine the status of the flow control member 200 (e.g., to indicate whether the flow control member 200 is in the closed position 206 or the open position 302), determine how much the flow control member 200 has opened, determine a flow rate through the orifice 316 of the membrane 306, etc. The sensors 338 of the illustrated example can include, but are not limited to, a strain gauge (e.g., a Rosette Strain Gauge) to measure or detect a strain on the membrane body 308, a flow meter, a temperature sensor, a pressure sensor, a viscosity sensor, any combination thereof, and/or any other sensor to monitor other parameters of the flow control member 200 and/or characteristics of a fluid flow through the fluid flow passageway 202. In some examples, the flow control member 200 includes a plurality of sensors 338 (e.g., more than two sensors 338) disposed around the membrane 306. For example, a plurality of sensors 338 can be disposed at multiple locations along a diameter (e.g., the second dimension 320) of the membrane 306 and/or along a length of the membrane 306 (e.g., between the base 310 and the annular tip 312). In some examples, a single sensor 338 can be disposed on the membrane 306. For example, the sensor 338 could be a single flow meter to measure fluid flow through the fluid flow passageway 202. In some examples, the flow control member 200 does not include the sensors 338.

Figure 3C:
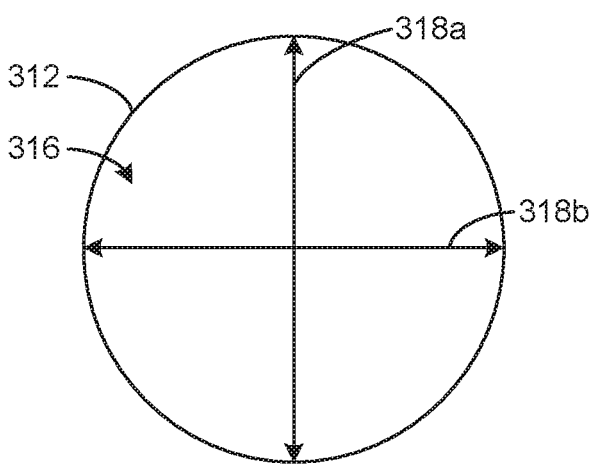
FIG. 3C is a profile view of an example orifice of the example fluid apparatus of FIGS. 1 and 2 when in the example open position shown in FIG. 3A.

FIG. 3C is a profile view of the orifice 316 of FIG. 3A when the example fluid apparatus 100 of FIGS. 1 and 2 is in the example open position 302. In the illustrated example, the orifice 316 is substantially circular. As used herein, substantially circular means that the orifice 316 has a perfectly uniform diameter (e.g., the first dimension 318) or a substantially uniform diameter (e.g., the first dimension 318). For example, substantially circular as used herein means that a first tip diameter 318$a$ and a second tip diameter 318$b$ measured at different locations along a circumference of the orifice 316 can be identical. In some examples, substantially circular as used herein means that the first diameter 318$a$ has a value that is within 5% of the second tip diameter 318$b$. However, substantially circular does not mean that the orifice 316 has an oblong, elliptical or oval shape (i.e., where a major axis is significantly greater than a minor axis to form, for example, an elliptical shape).

Figure 4A:
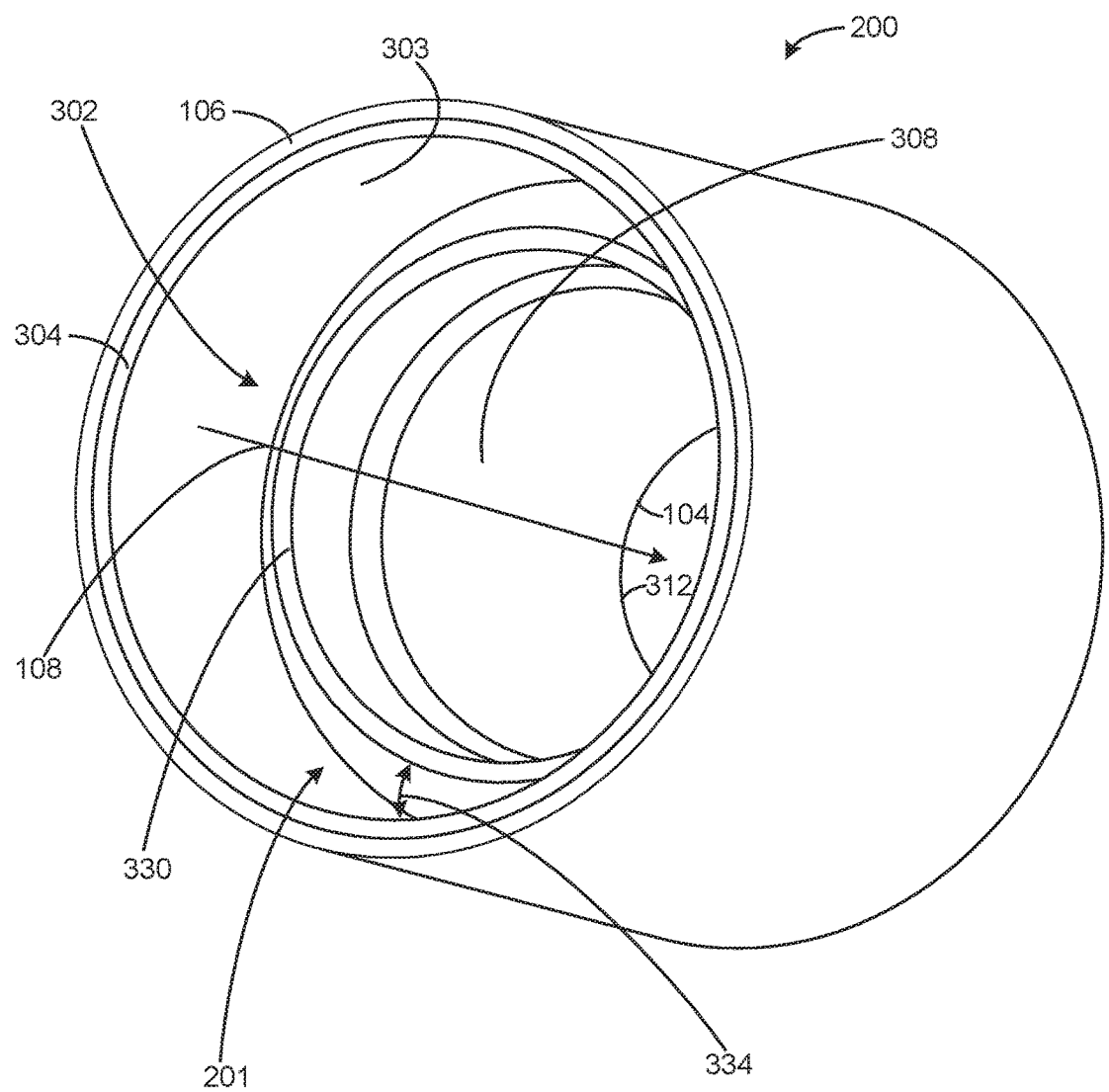
FIG. 4A is a partial, perspective view of the example flow control member of FIG. 2 shown in the example open position as viewed from a first side of the example fluid apparatus.
Figure 4B:
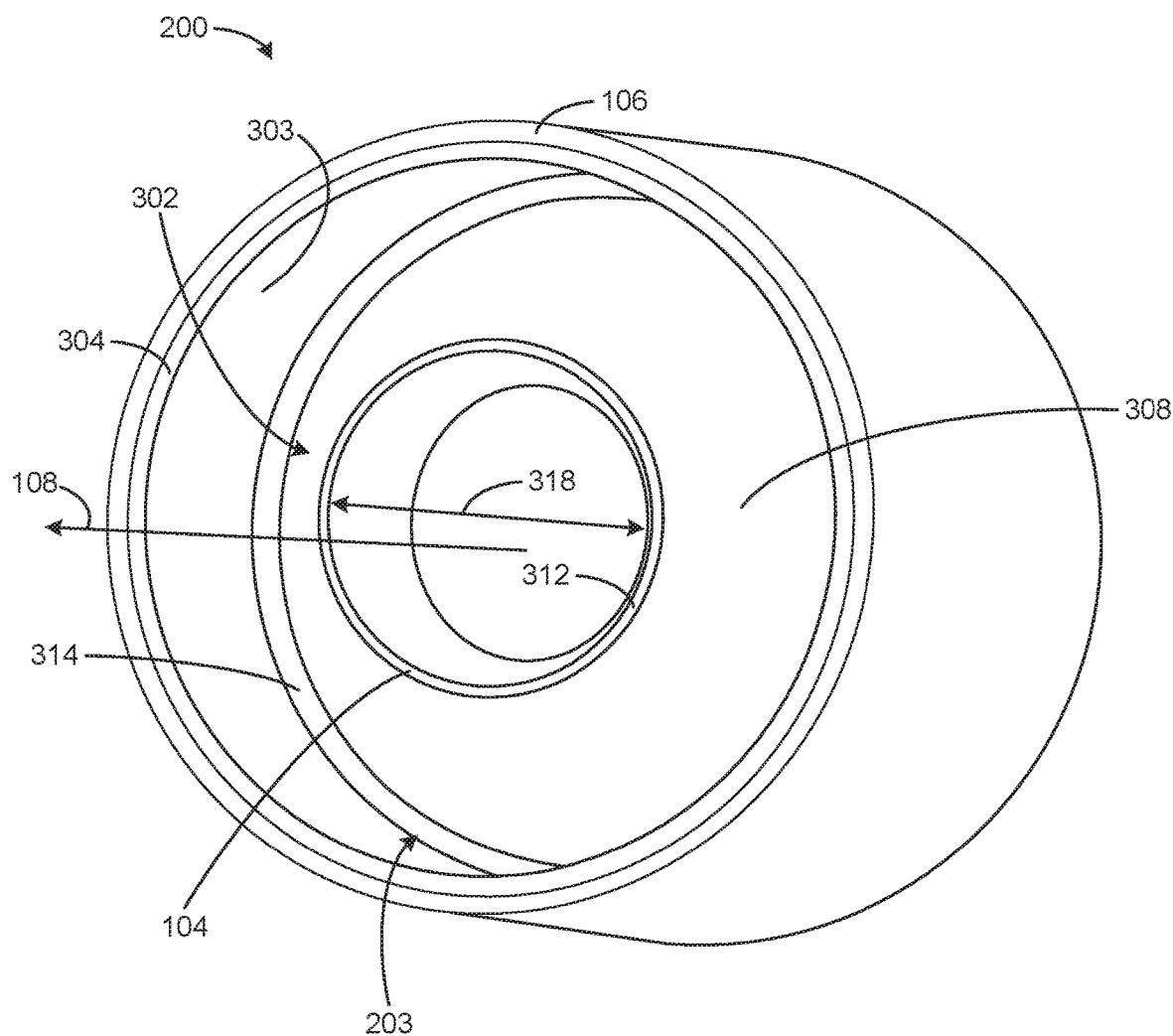
FIG. 4B is a partial, perspective view of the example flow control member of FIG. 2 shown in the example open position as viewed from a second side of the example fluid apparatus opposite the first side.

FIG. 4A is a partial, perspective view of the example fluid apparatus 100 of FIG. 3A viewed from the first side 201 of the example fluid apparatus 100. FIG. 4B is a partial, perspective view of the example fluid apparatus 100 of FIG. 3A viewed from the second side 203 of the example fluid apparatus 100. Referring to FIGS. 4A and 4B, when fluid flows through the fluid apparatus 100 in the flow direction 108 and has a pressure greater than the cracking pressure or opening pressure of the flow control member 200, the fluid pressure causes the flow control member 200 to move to the open position 302. In the open position 302, the annular tip 312 flexes toward the body 300 to allow fluid to flow to the second side 203 of the fluid apparatus 100. Further, the stop 330 is not engaged with the body 300, and the membrane body 308 is free to flex about the base 310 in either direction (e.g., the membrane body 308 can flex to open the annular tip 312 further or flex to move the annular tip 312 closer together) depending on changes in fluid pressure in the fluid flow passageway 202. Accordingly, the stop 330 is separated from the base 310 at the open position 302 (e.g., by a distance defined by the gap angle 334). The annular tip 312 extends away from a center of the fluid flow passageway 202 (e.g., in a radial direction) to create the orifice 316 through the flow control member 200. In some examples, the transition 314 is constructed to have a natural resistance to bending (e.g., bending to the open position 302) that is overcome by the pressure created in the fluid apparatus 100 by the flow of fluid in the flow direction 108.

Figure 5A:
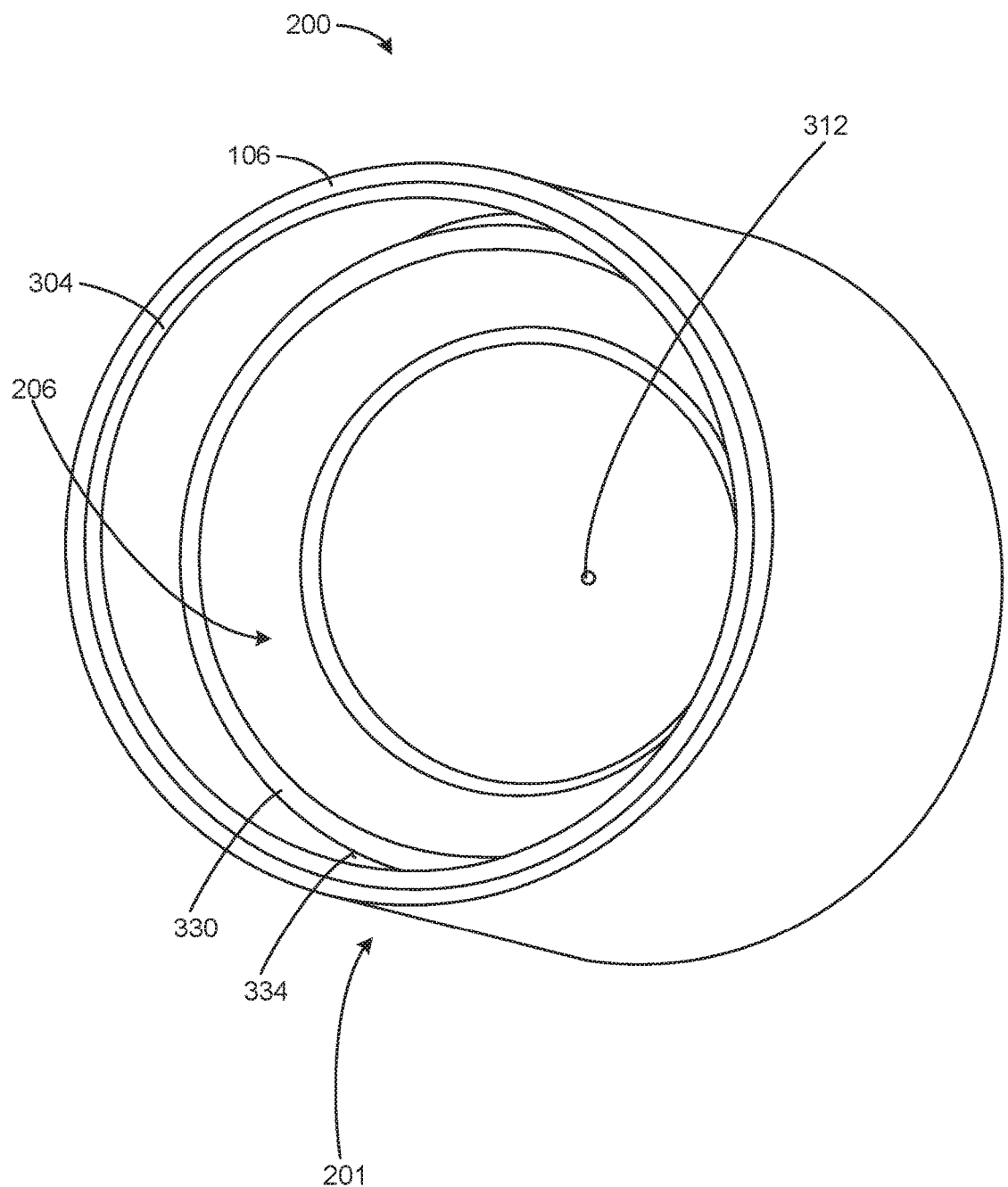
FIG. 5A is a perspective view of the example flow control member of FIG. 2 shown in an example closed position as viewed from the first side of the example fluid apparatus.
Figure 5B:
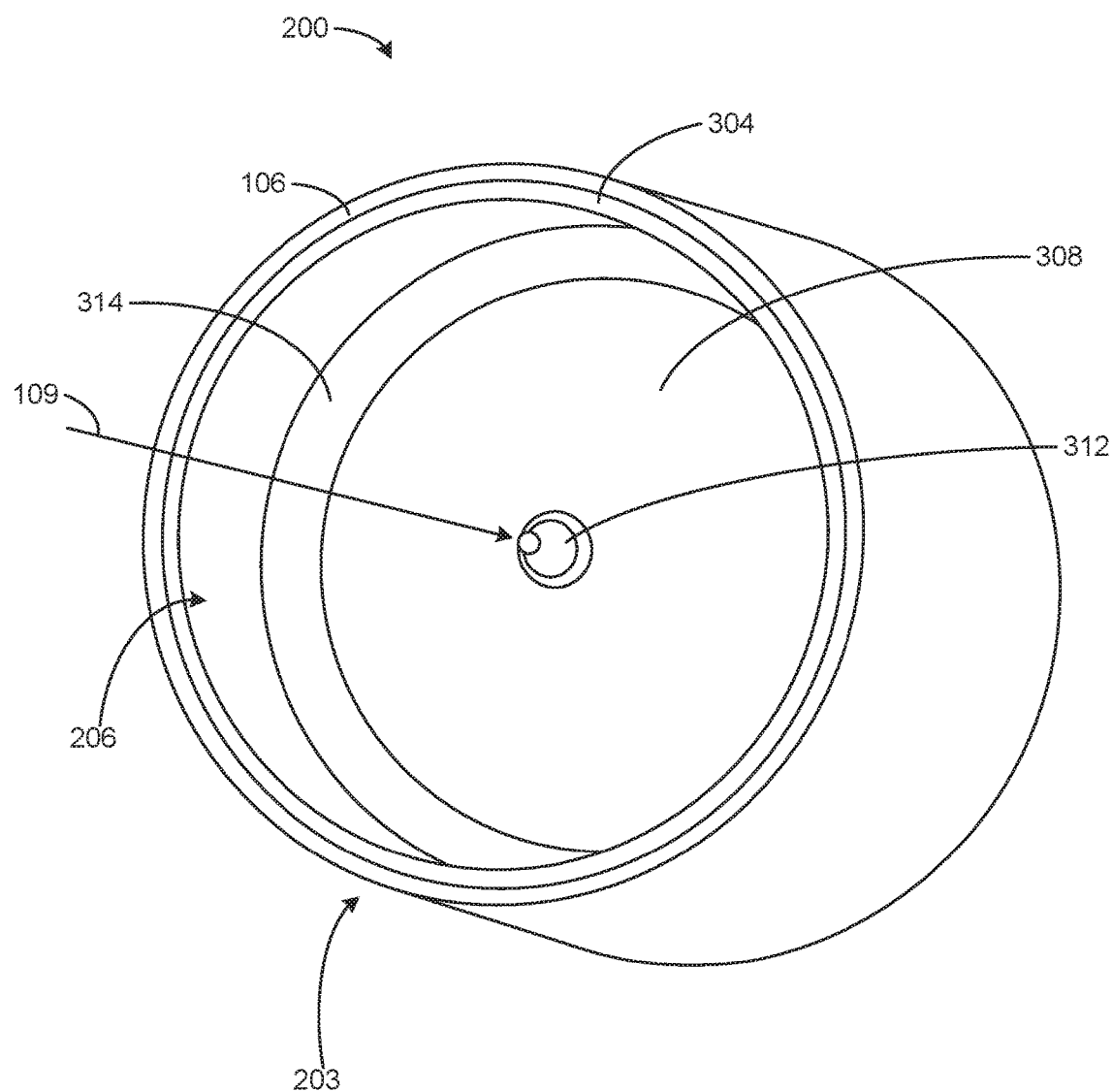
FIG. 5B is a perspective view of the example flow control member of FIG. 2 shown in the example closed position as viewed from the second side of the example fluid apparatus.

FIG. 5A is a partial, perspective view of the example fluid apparatus 100 of FIG. 3B viewed from the first side 201 of the example fluid apparatus 100. FIG. 5B is a partial, perspective view of the example fluid apparatus 100 of FIG. 3B viewed from the second side 203 of the example fluid apparatus 100. In the illustrated example, the flow of fluid is in a reverse flow direction (e.g., the reverse flow direction 309 shown in connection with FIG. 3B). In such an example, the flow control member 200 remains in the closed position 206 to prevent the flow of fluid through the fluid apparatus 100 in the reverse flow direction 109 (e.g., the stop 330 engages the body 300 to prevent movement of the membrane 306).

When the flow control member 200 moves from the open position 302 shown in FIGS. 4A and 4B to the closed position 206 shown in FIGS. 5A and 5B, the transition 314 flexes back toward a resting position (e.g., the closed position 206) when pressure is no longer applied on the flow control member 200 from the first side 201. A flexion of the transition 314 acts as a spring to snap (e.g., close rapidly) the annular tip 312 together. Further, the material properties of the membrane body 308 (e.g., variable stiffness along the membrane body 308) eliminate the need for dashpots to dampen the motion of the flow control member 200, as the membrane body 308 dampens motion of the closing of the annular tip 312 during closing of the flow control member 200. For example, the lower stiffness of the annular tip 312 (e.g., as compared to a higher stiffness of the base 310)

mitigates or prevents motion (e.g., the annular tip 312 opening slightly after rapidly closing) after the annular tip 312 comes together. Additionally, in some examples, the membrane body 308 experiences minor levels of friction (e.g., no friction) as the membrane body 308 rotates between the open position 302 and the closed position 206. For example, because the membrane body 308 is not moving while in contact with another part (e.g., sliding against, rotating against, etc.), the membrane body 308 rotates with little or no friction. In such examples, the low friction levels allow the flow control member 200 to close rapidly. Additionally, an inertia of the membrane body 308 is low due to the short travel of the membrane body 308. The low inertia additionally aids the membrane body 308 in reducing subsequent motion of the membrane body 308 after closing (e.g., the annular tip 312 does not separate after snapping closed).

FIGS. 6A, 6B, 7A-7D, 8 and 9 illustrate other example fluid apparatus 600-900 disclosed herein. Those components of the example fluid apparatus 600-900 that are substantially similar or identical to the components of the example fluid apparatus 100 described above in connection with FIGS. 1, 2, 3A, 3B, 4A, 4B, 5A, and 5B and that have functions substantially similar or identical to the functions of those components will not be described in detail again below. Instead, the interested reader is referred to the above corresponding descriptions. To facilitate this process, similar reference numbers will be used for like structures.

FIG. 6A is a cross-sectional view of another example fluid apparatus 600 disclosed herein. The fluid apparatus 600 of the illustrated example includes a body 606 (e.g., a cylindrical wall) having an inner surface 608 defining the fluid flow passageway 604. In some examples, the body 606 can include the sleeve 304 of FIGS. 3A and 3B and/or the housing 106 of FIG. 1. The fluid apparatus 600 includes a plurality of example flow control members 200 positioned within the fluid flow passageway 604 of the example fluid apparatus 600. For example, a first flow control member 602a, a second flow control member 602b, and a third flow control member 602c are spaced along a longitudinal axis of the fluid flow passageway 604. In this example, three flow control members are shown. However, in some examples, the fluid apparatus 600 can have two flow control members 200 or more than three flow control members 200. For example, the fluid apparatus 600 can be implemented using any number of flow control members desired for a specific application. Additionally, the flow control members 602a-c do not include the sensors 338.

The flow control members 602a-602c are arranged in series and are configured to operate at identical or substantially the same cracking pressures (e.g., within between 1 and 5 psi) to provide redundant sealing capability (e.g., increases fault tolerance for the fluid apparatus 600). For example, if the third flow control member 602c fails during a closing event or condition, the first and second flow control members 602a-b move to their respective closed positions 206 to prevent fluid flow in a direction opposite a flow direction 610. In such examples, the fluid apparatus 600 remains functional to allow unidirectional flow (e.g., in the flow direction 610) regardless of the failure of the third flow control member 602c and/or leakage through the third flow control member 602c.

In some examples, the flow control members 602a-602c can be configured to operate at different opening or cracking pressures. Such configuration enables gradual opening of the fluid apparatus 600 to enable gradual fluid flow between the inlet 102 and the outlet 104. Thus, for example, the flow control members 200 may be configured to provide a progressively or gradually increasing opening (e.g., cracking) pressure from the first flow control member 602a to the third flow control member 602c. In other words, a fluid pressure can cause the first flow control member 602a to move to the open position 302, but the fluid pressure may not cause the second flow control member 602b and/or the third flow control member 602c to move to the open position 302 if the fluid pressure is less than a cracking pressure of the second flow control member 602b and a cracking pressure of the third flow control member 602c. For example, to open the second flow control member 602b after the first flow control member 602a moves to the open position 302, fluid can accumulate in a first chamber 614 between the first flow control member 602a and the second flow control member 602b until the pressure is greater than the cracking pressure of the second flow control member 602b. To open the third flow control member 602c after the second flow control member 602b moves to the open position 302, fluid can accumulate in a second chamber 616 between the second flow control member 602b and the third flow control member 602c until the pressure is greater than the cracking pressure of the third flow control member 602c. Thus, in some examples, when the cracking pressure of the third flow control member 602c is greater than the cracking pressures of the second flow control member 602b and the first flow control member 602a, the flow control members 602a-c may not move to their respective open positions simultaneously or substantially simultaneously. Thus, in some instances, the fluid apparatus 100 may provide a lag or delay in opening the second flow control member 602b and/or the third flow control member 602c. Such opening (e.g., cracking pressures) may be provided by adjusting one or more characteristics of the fluid flow control members 602a-c such as, for example, lengths or distances (e.g., vertical distances) between the base 310 and the tip 312, a thickness of the membranes 306 (e.g., the thicknesses 324, 326, 328 of FIG. 3A), the stiffness characteristics, and/or any other characteristic(s) of the membrane 306, the transition 314, the sleeve 304, etc.

FIG. 6B is a cross-sectional view of the example fluid apparatus 600 of FIG. 6A implemented in a system 601 that may be prone to fluid hammer. In the system 601 of FIG. 6B, fluid hammer can cause a pressure wave 612 that propagates through the fluid flow passageway 604 of the fluid apparatus 600. The pressure wave 612 may be caused, for example, by a closing of a downstream valve (e.g., which creates water hammer or hydraulic shock). The example pressure wave 612 flows in a direction opposite the flow direction 610 and provides an increased pressure between the second flow control member 602b and the third flow control member 602c. When the pressure wave 612 provides a pressure that is greater than a pressure of the fluid upstream from the second flow control member 602b, the second flow control member 602b moves to the closed position 206. Thus, in response to the pressure wave 612, the example second flow control member 602b closes to prevent the pressure wave 612 from continuing to propagate through the fluid flow passageway 604. The second flow control member 602b accordingly acts as a damper or shock absorber to dissipate the force caused by the pressure wave 612, reducing or eliminating the vibrations and/or other negative effects that the pressure wave 612 may cause in the fluid apparatus 600. In some previously known examples, a pressure wave such as the pressure wave 612 can be eliminated by including fluid reservoirs or other dampening feature(s) in line with the fluid apparatus 600 to absorb the forces caused by the pressure wave 612. The flow control members 602a-602c eliminate the need for fluid reservoirs or other dampening apparatus.

FIG. 7A is a partial, cutaway view of another example fluid apparatus 700a disclosed herein. The fluid apparatus 700a includes example disc-shaped flow control members 702. For example, the disc-shaped flow control members 702 are disposed equidistantly. Alternatively, the disc-shaped flow control members 702 can be spaced irregularly (e.g., not an equal distance apart) in the fluid apparatus 700a. Additionally, the disc-shaped flow control members 702 are spaced apart to prevent the disc-shaped flow control members 702 from contacting one another during operation of the fluid apparatus 700a. In some examples, the fluid apparatus 700a is entirely one piece (e.g., the fluid apparatus 700a is a unitary structure).

In some examples, the disc-shaped flow control members 702 have a constant thickness and are generally flat across a diameter of a fluid flow passageway 202 defined by the body 300 (e.g., a sleeve 304 and/or a housing 106) of the fluid apparatus 700a (e.g., horizontal in the orientation of FIG. 7A). The disc-shaped flow control members 702 deflect upward (e.g., in the orientation of FIG. 7A) and crack under pressure created by the fluid in the fluid flow passageway 202. When the pressure of fluid in the fluid flow passageway 202 (e.g., at the inlet 102) is greater than a cracking pressure of the disc-shaped flow control members 702, the disc-shaped flow control members 702 move to respective open positions to allow fluid to flow through the fluid apparatus 100 toward the outlet 104. Additionally, or alternatively, when fluid at the outlet 104 increases to a pressure that is greater than the cracking pressure of the disc-shaped flow control members 702, the disc-shaped flow control members 702 deflect toward the inlet 102 (e.g., downwardly in the orientation of FIG. 7A) and crack under the pressure created by the fluid flow in the fluid flow passageway 202. In such an example, the disc-shaped flow control members 702 move to respective open positions to allow fluid to flow through the fluid apparatus 100 toward the inlet 102. Thus, the disc-shaped flow control members 702 can be configured to provide a two-way burst valve.

FIG. 7B is a partial, cutaway view of another example fluid apparatus 700b disclosed herein that includes burst-disk flow control members 704. The fluid apparatus 700b of the illustrated example includes three burst-disk flow control members 704 spaced at equal distances apart within a fluid flow passageway 202 of the fluid apparatus 700b. Alternatively, the burst-disk flow control members 704 can be spaced irregularly (e.g., not an equal distance apart) in the fluid apparatus 100. In some examples, greater or fewer burst-disk flow control members 704 may be implemented within the fluid apparatus 100. In the illustrated example, each of the burst-disk flow control members 704 includes a membrane 706 and a jacket 708. In some examples, the membranes 706 are flexible membranes coupled to the jackets 708. The membranes 706 and the jackets 708 of the illustrated example may be made from different materials. For example, the membranes 706 may be made from an elastic material, such as rubber or a synthetic material. Alternatively, the jackets 708 of the illustrated example may be made from a ceramic material or other hard, inelastic material. In some examples, the burst-disk flow control members 704 are coupled to the fluid flow passageway 202 of the fluid apparatus 100. In some examples, the fluid apparatus 100 is a single piece (e.g., the housing 106, the sleeve 304, and the burst-disk flow control members 704 are a unitary structure).

In operation, the burst-disk flow control members 704 of the illustrated example block the flow of fluid through the fluid flow passageway 202 until a force (e.g., caused by pressure exerted by fluid flow) in the fluid flow passageway 202 exceeds a threshold load or rating (e.g., a pre-determined pressure rating) of the burst-disk flow control members 704. When the force provided by the fluid on the burst-disk flow control members 704 exceeds the threshold load, the burst-disk flow control members 704 burst (e.g., rupture, tear, rip or otherwise open) to allow fluid to flow through the fluid flow passageway 202. Specifically, after the membranes 706 burst open based on a pressure exceeding a threshold pressure or a threshold load, the membranes 706 do not reseal (e.g., do not return to a closed position to stop fluid flow in the fluid flow passageway 202). Additionally, or alternatively, the burst-disk flow control members 704 may be configured to rupture when a temperature of a process fluid exceeds a threshold temperature.

During operation, the membranes 706 of the burst-disk flow control members 704 remain coupled to the jackets 708 and do not detach from the membranes 706 and/or the jackets 708. In this manner, the burst-disk flow control members 704 prevent debris or particles from the membranes 706 from flowing through the fluid flow passageway 202 after the membranes 706 rupture. For example, when the burst-disk flow control members 704 burst or rupture to allow fluid flow through the fluid flow passageway 202, the membranes 706 remain coupled to the jackets 708 and are pushed to an outer perimeter of the fluid flow passageway 202 by the force of the fluid flow. In such an example, the burst-disk flow control members 704 do not create debris or particulate (e.g., a part or whole of the burst-disk flow control member 704) that may otherwise flow downstream through the fluid apparatus 100 to hinder downstream processes (e.g., damage created by foreign object or debris (FOD)). In some examples, the burst-disk flow control members 704 may be made from a material that dissolves in fluid after bursting. For example, the burst-disk flow control members 704 may rupture and the membranes 706 may be carried downstream. In such examples, the membranes 706 dissolve in the fluid after breaking away from the jackets 708, while the jackets 708 remain coupled to the outside of the fluid flow passageway 202 in their respective original positions. In some examples, the burst-disk flow control members 704 isolate the membranes 706 from pressure gradients that travel through the housing 106 of the fluid apparatus 100 (e.g., caused by fluid flow in the fluid apparatus 100).

Figure 7C:
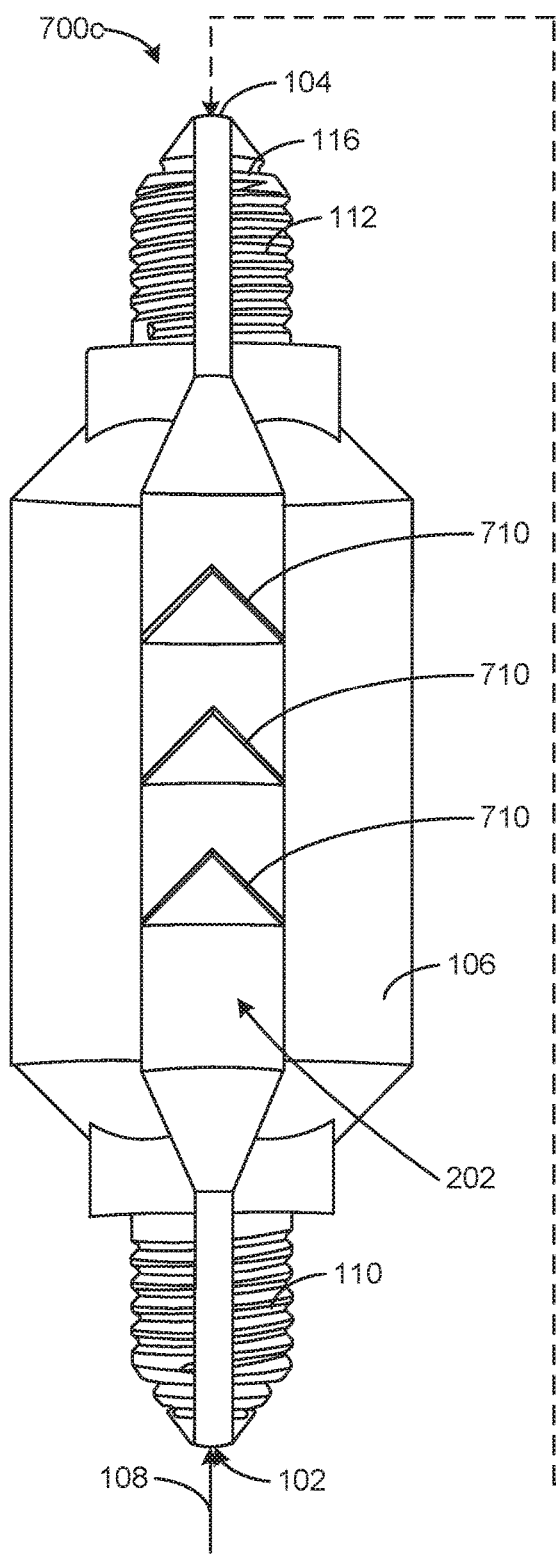
FIG. 7C is a partial cutaway view of another example fluid apparatus disclosed herein including flow control members having example conical profiles.

FIG. 7C is a partial cutaway view of another example fluid apparatus 700c disclosed herein including flow control members 710 having example conical profiles. The example fluid apparatus 700c includes the conical flow control members 710 spaced in a fluid flow passageway 202 of the fluid apparatus 700c. The spacing between the conical flow control members 710 prevents the conical flow control members 710 from contacting one another during operation of the fluid apparatus 100, preventing and/or reducing abrasion of the conical flow control members 710.

In the illustrated example, the conical flow control members 710 operate to allow fluid flow in the flow direction 108 where fluid flows from the inlet 102 to the outlet 104 of the fluid apparatus 700c. In some examples, each of the conical flow control members 710 functions in a manner similar to the flow control member 200 discussed in connection with FIGS. 2-5B. For example, the conical flow control members 710 are implemented as one-way check valves within the fluid flow passageway 202 of the fluid apparatus 700c. The conical shape of the flow control members 710 prevents the flow control members 710 from inverting when the flow control members 710 are in the closed position (e.g., as shown in FIG. 7C).

Figure 7D:
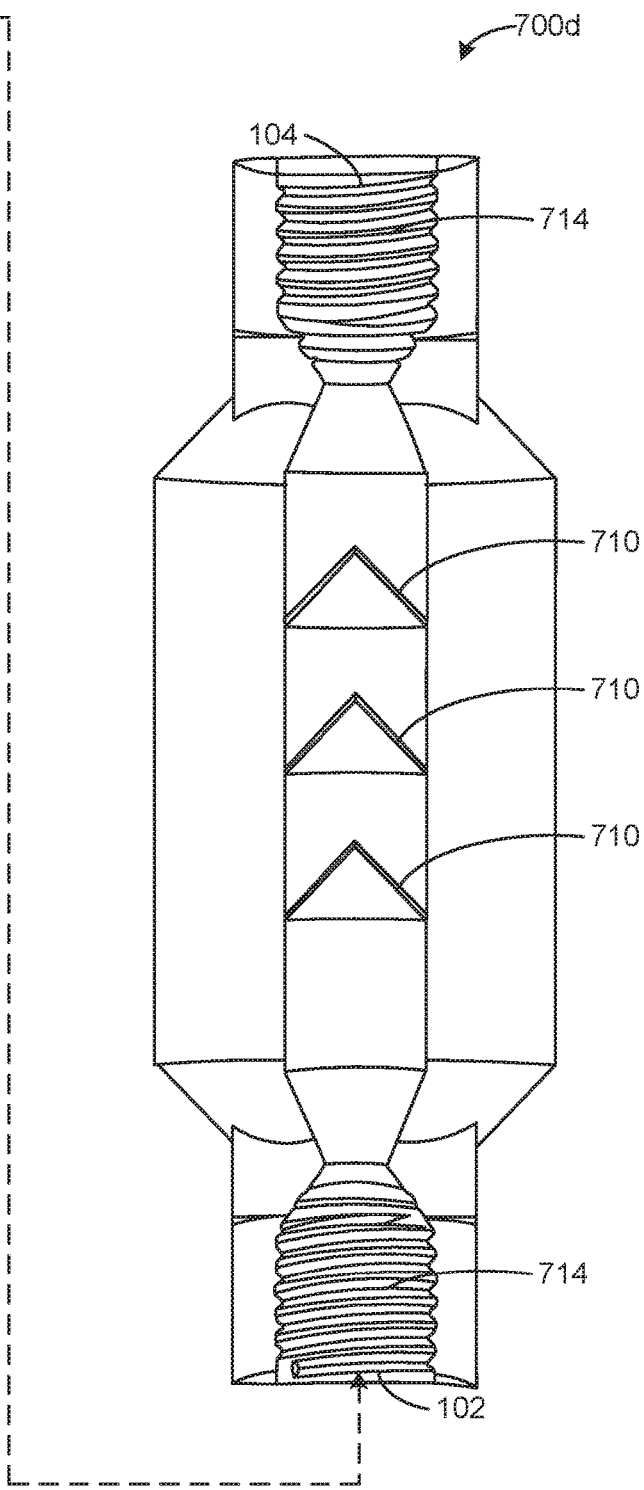
FIG. 7D is a partial cutaway view of another example fluid apparatus disclosed herein having an example female fitting.

FIG. 7D is a partial cutaway view of another example fluid apparatus 700d disclosed herein that includes female fittings 714 to enable the fluid apparatus 700d to couple to, for example, a fluid apparatus having a male fitting (e.g., the first fitting 110 of FIG. 1 and/or the first fitting 110 of FIG. 7C). In some examples, the female fitting 714 of the fluid apparatus 700d of FIG. 7D can be threadably coupled to the second fitting 112 of the fluid apparatus 700c of FIG. 7C to fluidly couple the example fluid apparatus 700c of FIG. 7C and the fluid apparatus 700d of FIG. 7D (e.g., to enable multiple fluid apparatus to be fluidly coupled). In some examples, a body (e.g., the body 300, the housing 106) of a fluid apparatus can include a first end having a female fitting (e.g., the female fitting 714) and a second end having a male fitting (e.g., the first fitting 110).

Figure 8:
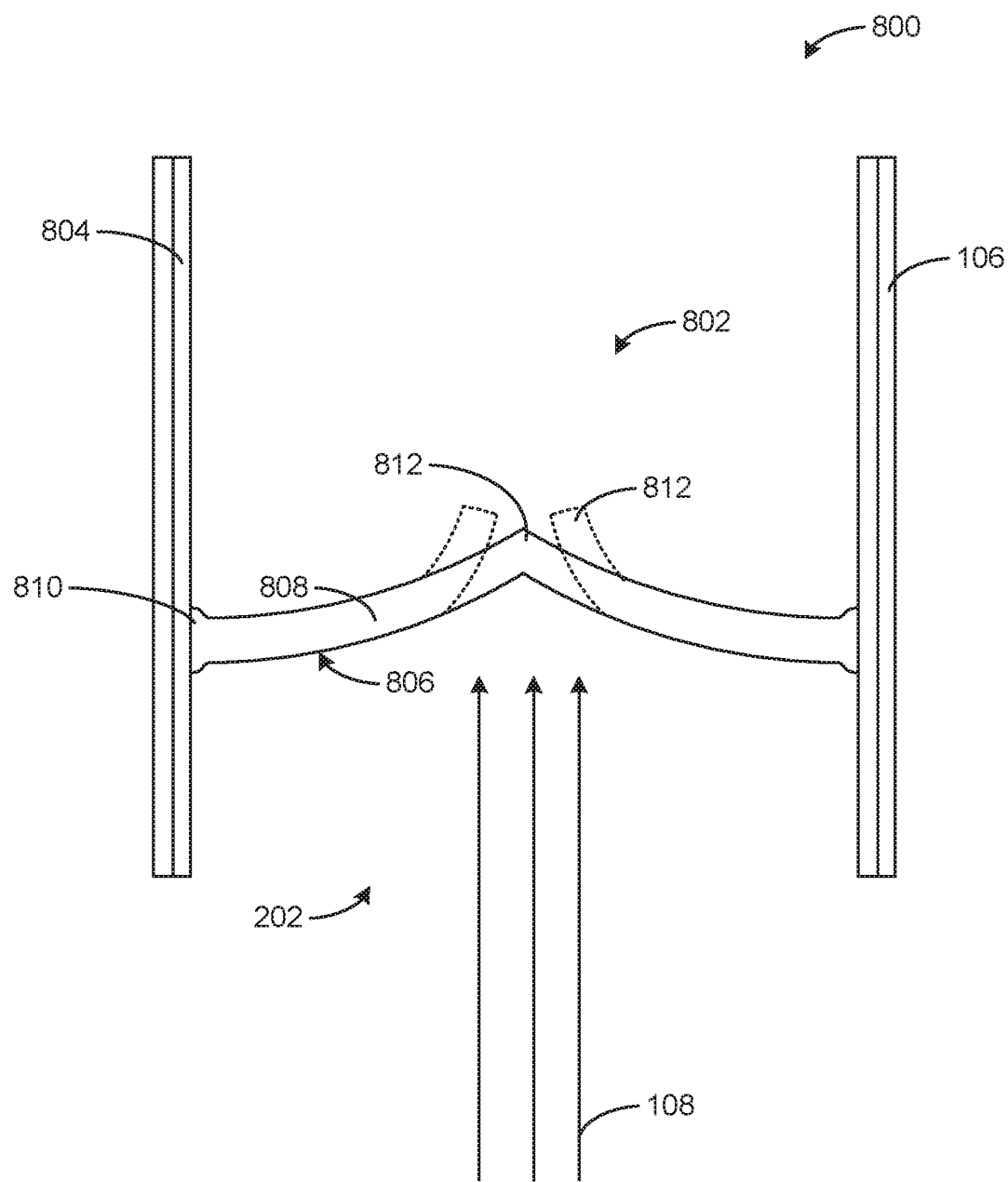
FIG. 8 is a cross-sectional view of another example fluid apparatus disclosed herein.

FIG. 8 is a cross-sectional view of another fluid apparatus 800 having another example flow control member 802 disclosed herein. The example flow control member 802 is a burst valve. In the illustrated example, the flow control member 802 is positioned in a fluid flow passageway 202 defined by a body 300. The example flow control member 802 includes a sleeve 804 and a membrane 806. The membrane 806 includes a membrane body 808 extending from a base 810 toward a tip 812. The membrane body 808 has a curved, conical profile similar to the membrane body 308 shown in FIGS. 3A and 3B. However, the membrane body 808 of FIG. 8 has a radius of curvature that is greater than a radius of curvature of the membrane 306 of FIGS. 3A and 3B. In other words, a slope of a cross-sectional profile of the membrane 806 is less than a slope of a cross-sectional profile of the membrane 306 of FIGS. 3A and 3B (i.e., the membrane 806 does not curve upward (e.g., in the orientation of FIG. 8) a same distance relative to the base 810 as the membrane body 308 of FIGS. 3A and 3B). The flow control member 802 of FIG. 8 further does not include the stop 330 discussed in connection with FIGS. 3A and 3B.

The flow control member 802 of FIG. 8 operates as a burst valve when fluid flowing in the flow direction 108 exerts a load on the flow control member 802 that exceeds a threshold load. For example, the membrane body 808 bends or deflects as shown in FIG. 8 when a load meeting or exceeding a threshold load is exerted on the flow control member 802. When a load exceeding the threshold load is exerted on the flow control member 802 (e.g., by fluid flowing in the fluid flow passageway 202), the membrane body 808 stays in the deflected position (e.g., shown in FIG. 8 by the dotted lines) throughout operation of the flow control member 802. In some examples, the membrane body 308 is composed of multiple materials having different stiffnesses to facilitate deflection of the membrane body 808. For example, a material near the base 810 may be a stiff material that does not deflect when the load on the flow control member 802 exceeds the threshold load, while the part of the membrane body 808 near the tip 812 is composed of a material having lower stiffness such that the membrane body 308 deflects near the tip 812 when the load on the flow control member 802 exceeds the threshold load. The flow control member 802, when implemented as a burst valve, advantageously does not rupture or burst, thereby preventing material (e.g., debris, particulates, etc.) from the flow control member 802 to flow downstream. The flow control member 802 instead deflects and stays in the deflected position to allow fluid flow through the flow control member 802. Because no debris or particulate flows downstream from the flow control member 802, the burst valve does not cause damage to downstream components or hinder downstream processes.

Figure 9:
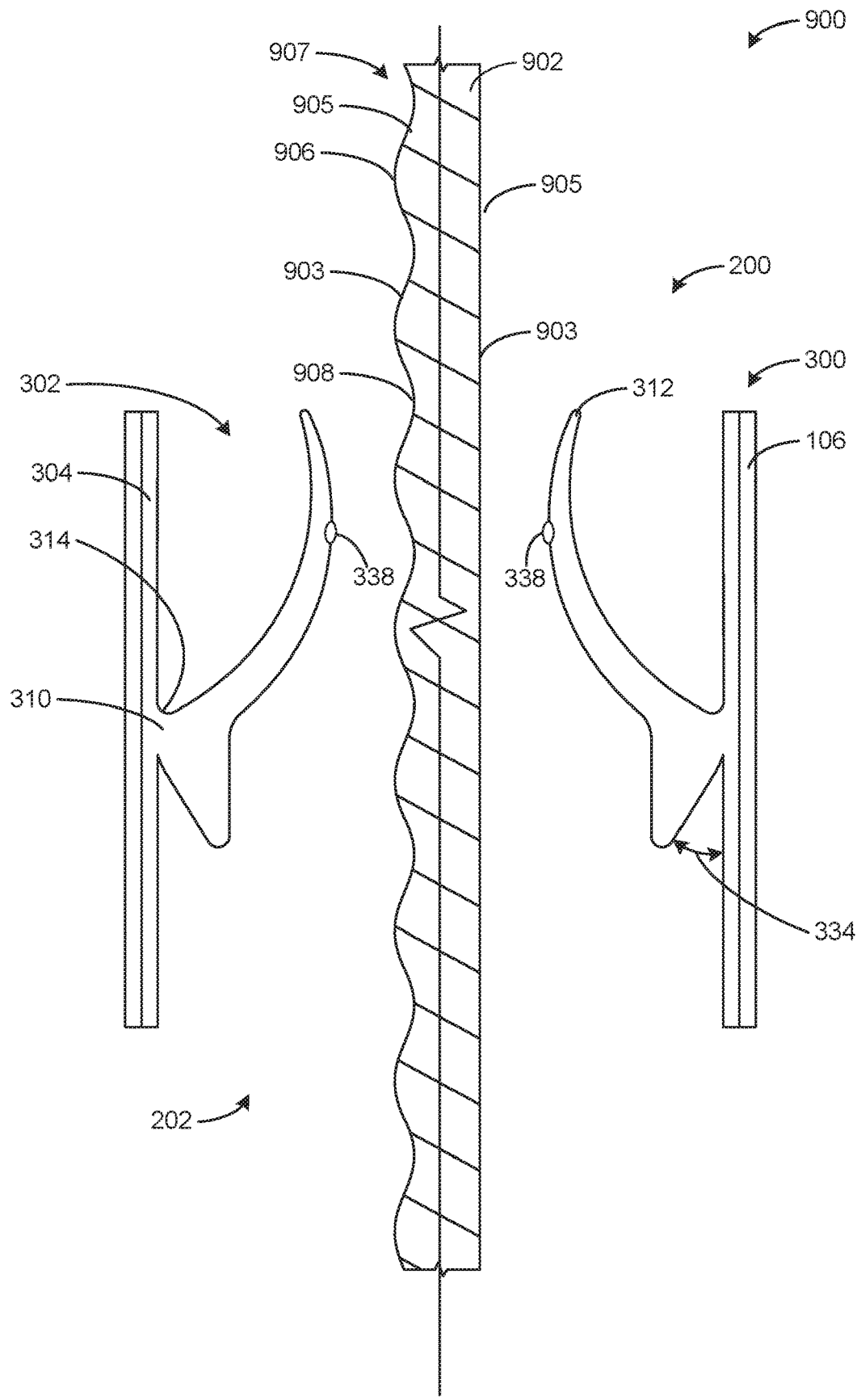
FIG. 9 is a cross-sectional view of another example fluid apparatus disclosed herein implemented with a housing disposed within the fluid flow passageway.

FIG. 9 is a cross-sectional view of another example fluid apparatus 900 disclosed herein implemented with a housing disposed within the fluid flow passageway 202. In the illustrated example, a central body 902 is inserted within the fluid flow passageway 202 and passes through the flow control member 200. The central body 902 is disposed centrally in the fluid flow passageway 202. In some examples, the central body 902 is a cable, tube, wire, a housing, etc. In some examples, the central body 902 improves the sealing of the flow control member 200. For example, when the annular tip 312 of the flow control member 200 bends or deflects toward the closed position (e.g., the closed position 206 of FIG. 3B), the annular tip 312 closes against and/or around an outer surface 903 of the central body 902 to seal off the fluid flow passageway 202. In some examples, the central body 902 is a data cable that transmits data between a location upstream from the fluid apparatus 900 and a location downstream from the fluid apparatus 900. In some examples, the central body 902 is a cylindrical tube that can transport fluid. The outer surface 903 of the central body 902 can have a cylindrical shape 905 (e.g., as shown on the right-hand side of FIG. 9). In some examples, the outer surface 903 of the central body 902 can have a sinusoidal shape (e.g., as shown on the left-hand side of FIG. 9). The outer surface 903 of the central body 902 can be configured to vary a cracking pressure of the flow control member 200. In some examples, the central body 902 can be used to adjust or fine-tune (slightly vary) a cracking pressure of the fluid apparatus 900. For example, to adjust the cracking pressure of the fluid apparatus 900, the central body 902 can be adjusted in a longitudinal direction relative to the membrane 306 to enable the tip 312 to engage a peak 906 or a trough 908 of the sinusoidal shape 907. The central body 902 can be composed of plastic, metal, alloys and/or any other suitable material(s).

Although each example fluid apparatus 100, 600, 700a-d, 800, and 900 of FIGS. 1, 2, 3A-3B, 4A-4B, 5A-5B, 6, 7A-7D, 8 and 9 disclosed above have certain features, it should be understood that it is not necessary for a particular feature of one example of the fluid apparatus 100, 600, 700a-d, 800, and 900 of FIGS. 1, 2, 3A-3B, 4A-4B, 5A-5B, 6, 7A-7D, 8 and 9 to be used exclusively with that example. Instead, any of the features of the example 100, 600, 700a-d, 800, and 900 of FIGS. 1, 2, 3A-3B, 4A-4B, 5A-5B, 6, 7A-7D, 8 and 9 described above and/or depicted in the drawings can be combined with any of the example 100, 600, 700a-d, 800, and 900 of FIGS. 1, 2, 3A-3B, 4A-4B, 5A-5B, 6, 7A-7D, 8 and 9, in addition to or in substitution for any of the other features of those examples. One example's features (e.g., thermal resistivity) are not mutually exclusive to another example's features. Instead, the scope of this disclosure encompasses any combination of any of the features. In some examples, a fluid apparatus in accordance with the teachings of this disclosure may have a combination of the features of the example 100, 600, 700a-d, 800, and 900 of FIGS. 1, 2, 3A-3B, 4A-4B, 5A-5B, 6, 7A-7D, 8 and 9 disclosed herein.

Example fluid apparatus disclosed herein (e.g., the fluid apparatus 100, 600, 700a-d, 800, 900) can be unitary (e.g., single-piece) structures, enabling the fluid apparatus to be manufactured using additive manufacturing processes (e.g., a direct metal laser sintering additive manufacturing process), injection molding, machining and/or any other manufacturing process(es). For example, the fluid apparatus may be manufactured using additive manufacturing methods and/or printers, such as VAT photopolymerization, powder bed fusion, binder jetting, bronze infusion/infiltration, material jetting, sheet lamination, material extrusion, directed energy deposition, directed metal laser sintering, direct metal printing, electron beam additive manufacturing, electron beam melting, electron beam powder bed, fused deposition modeling, indirect power bed, laser cladding technology, laser deposition technology, laser deposition welding, laser deposition welding with integrated milling, laser engineering net shape, laser freeform manufacturing technology, laser metal deposition-powder, laser metal deposition-wire, laser powder bed, laser puddle deposition, laser repair technology, powder directed energy deposition, stereolithography, selective laser melting, selective laser sintering, small puddle deposition, atomic diffusion additive manufacturing, big area additive manufacturing, bound metal deposition, composite-based additive manufacturing, digital light processing, digital light synthesis, gel dispensing printing, high-speed sintering, laminated object manufacturing, multi-jet fusion, quantum & nano-pico-femto-atto-scale manufacturing (QUN), rapid plasma deposition, selective deposition lamination, single-pass jetting, ultrasonic additive manufacturing, ytterbium in-situ manufacturing (YIM), as well as other mechanical adding machines and vivat-crescat-floreat hybrid processes thereof. For example, powder may be formed as collected waste powder or produced powder from electrical discharge machining processes.

Further, potential additive manufacturing materials used to manufacture one or more components (e.g., flow control members 200, 600a-c, the disc-shaped flow control members 702, the burst disk-shaped flow control members 704, the membranes 706, the flow control member 802, the sleeve 304, the housing 106, the base, 310, the transition 314, the membrane 306, the membrane body 308, the tip 312, etc.) and/or the example fluid apparatus (e.g., the fluid apparatus 100, 600, 700a-d, 800, 900) may include metals such as steel, stainless steel, Elgiloy®, titanium, copper, bronze, Hastalloy, zinc, aluminum, nickel, and alloys thereof (e.g., IN600, IN625, IN718, Ti—6Al—4V, AlSi10Mg, SS316, Monel, Monel K500, copper, Ti—5553, Ti—6Al—6V—2Sn, Ti—6242, Maraging Steel MSI 18, Mar 300, 316, 17-4, 15-4, cobalt chrome SP2, zircalloy, niobium (NB), Ti—Al—NB, γ-Ti—Al, zirconium, molybdenum, vitallium, vanadium, Ti—6Al—4V ELI, nickel alloy HX, Ni—Ti—20Hf, gold (Au), silver (Ag), etc.). as well as plastics, polymers and/or elastomers (e.g., acrylonitile butadiene styrene (ABS), polylactic acid (PLA), polyvinyle chloride, PTFE, acetal, Delrin®, polyvinyl alcohol, polycarbonate, and others including ULTEM®/PPSF/PPSU, Kel-F, Kevlar®, Nylon, Nomex®, fabrics, polybenzimidazole (PBI), glass, and carbon composite, boron nitride (BN), as well as thermoplastics such as polyamide (PA), polyphenylene sulfide (PPS), polyether ether ketone (PEEK), poly-ether-ketone-ketone (PEKK), polyetherimide (PEI), polyphenylsulfone (PPSU), polyethersulfone (PES), thermoplastic polyimide (TPI), liquid crystalline polymer (LCP), polyamide-imide (PAI), etc.). In some examples, the one or more components and/or structures of the fluid apparatus may be formed by altering the blending of deposited additively manufactured material such that functionally gradient material (FGM) properties may be achieved, including varying the coefficient of thermal expansion (CTE).

In some examples, the fluid apparatus (e.g., the fluid apparatus 100, 600, 700a-d, 800, 900) disclosed herein can be manufactured via a drop-in additive manufacturing process (e.g., a drop-in jacketed membrane). In some examples, the manufacture of the fluid apparatus (e.g., the housing 106 and/or the sleeve 304) can be partially manufactured using additive manufacturing. In such examples, a previously fabricated component (e.g., the membrane body 308) can be inserted or positioned adjacent the partially manufactured component (e.g., the sleeve 304). After the fabricated component (e.g., the membrane body 308) is positioned adjacent the partially 3D manufactured component, the additive manufacturing process resumes to couple or encompass the fabricated component and the partially manufactured component (e.g., resuming the additive manufacturing process to build the base 310 and/or the stop 330 and pivotally couple the previously fabricated membrane body 308 to the sleeve 304). Such a method of manufacturing the fluid apparatus enables the previously fabricated component, such as the membrane body 308, to have smaller tolerances and more precise features than if the membrane 306 were manufactured simultaneously with the fluid apparatus using additive manufacturing. Additionally, such a method of manufacturing enables a first portion of the fluid apparatus (e.g., a membrane) to be formed from a first material and a second portion of the fluid apparatus (e.g., a valve body) to be formed from a second material different than the first material. Further, design parameters (e.g., thickness, radius of curvature, etc.) and material properties (e.g., stiffness) of the fluid apparatus can be fine-tuned during the manufacturing process to accommodate a wide range of fluid flow rates and adjust a responsiveness of the flow control member (e.g., a speed at which the flow control member closes) to fit a desired application.

Some example fluid apparatus disclosed herein (e.g., the membrane 306, the body 300, the sleeve 304 and/or a housing 106) can be formed with auxetic properties (e.g., a material having a negative Poisson's ratio). In some examples, the auxetic properties of the example fluid apparatus disclosed herein enable fine-tuning or adjustments of performance characteristic(s) (e.g., a cracking pressure) of fluid apparatus after the fluid apparatus has been manufactured. In such examples, the flexible membrane can be formed from a material having auxetic properties such that, when stretched, the flexible membrane 306 (e.g., the membrane body 308) becomes thicker in a direction perpendicular to the applied force and, when compressed, becomes thinner in a direction perpendicular to the applied force. Thus, one or more dimensional characteristics (e.g., a length, a width, a thickness, etc.) of the component (e.g., the membrane 306, the body 300, the sleeve 304, the housing 106) can be further modified based on a desired application by stretching or compressing the component. For example, a dimensional characteristic (e.g., a length) of the component (e.g., the membrane 306, the body 300, the sleeve 304, the housing 106) can be increased by stretching the component, thus changing or altering performance characteristics of the fluid apparatus (e.g., increasing a cracking pressure). Alternatively, a dimensional characteristic (e.g., a thickness) of the example component (e.g., the membrane 306, the body 300, the sleeve 304, the housing 106) can be decreased by compressing the component, thereby changing or altering a performance characteristic of the fluid apparatus (e.g., to decrease a cracking pressure). In such examples, performance characteristics (e.g., cracking pressure) of a fluid apparatus disclosed herein can be fine-tuned or adjusted (e.g., increased or decreased) to function in different applications.

In some examples, design parameters (e.g., a thickness, radius of curvature, etc.) for a flow control member (e.g., the flow control member 200 of FIGS. 2-5B) can be determined and/or verified using one or more equations. For example, the following wall-thickness equation (Equation 1) can be used to verify a wall thickness for a flow control member:

$$\sigma_\theta = \frac{p_i r_i^2 - p_0 r_0^2 - \left(\frac{r_i r_0}{r}\right)^2 (p_0 - p_i)}{r_0^2 - r_i^2} \quad \text{(Equation 1)}$$

where $\sigma_\theta$ is amplitude stress, $r_i$ is an inner radius, $r_o$ is an outer radius, r is the location to determine stress, $p_i$ is an inner pressure, and $p_o$ is an outer pressure.

In some examples, Roark's equations can be used to determine a deflection of the flow control member. For example, for a fixed-free-fixed flow control member (e.g., a flow control member fixed at a peripheral edge and free to move at a central portion) under a uniformly distributed load, Equations 2 through 5 can be used:

$$y_b = \frac{-qa^4}{D}\left(\frac{C_1 L_{14}}{C_4} - L_{11}\right) \quad \text{(Equation 2)}$$

$$\theta_b = \frac{qa^3 L_{14}}{DC_4} \quad \text{(Equation 3)}$$

$$M_{ra} = -qa^2\left(L_{17} - \frac{C_7}{C_4}L_{14}\right) \quad \text{(Equation 4)}$$

$$Q_a = \frac{-q}{2a}(a^2 - r_o^2) \quad \text{(Equation 5)}$$

where $y_b$ is deflection, q is load per unit area, a is disk radius, D is a plate constant, $C_1$, $L_{14}$, $C_4$, $L_{11}$, $L_{17}$, and, $C_7$ are constant values, $\theta_b$ is radial slope, $M_{ra}$ is reaction moment, and $Q_a$ is shear force. Alternatively, for a fixed-free-fixed flow control member under a linearly increasing pressure, Equations 6 through 9 can be used to determine a deflection of the flow control member:

$$y_b = \frac{-qa^4}{D}\left(\frac{C_1 L_{15}}{C_4} - L_{12}\right) \quad \text{(Equation 6)}$$

$$\theta_b = \frac{qa^3 L_{15}}{DC_4} \quad \text{(Equation 7)}$$

$$M_{ra} = -qa^2\left(L_{18} - \frac{C_7}{C_4}L_{15}\right) \quad \text{(Equation 8)}$$

$$Q_a = \frac{-q}{6a}(2a^2 - r_o a - r_o^2) \quad \text{(Equation 9)}$$

where $L_{15}$, $L_{12}$, and $L_{18}$ are constant values. Alternatively, for a for a fixed-free-fixed flow control member under a parabolically increasing pressure, Equations 10 through 13 can be used to determine a deflection of the flow control member:

$$y_b = \frac{-qa^4}{D}\left(\frac{C_1 L_{16}}{C_4} - L_{13}\right) \quad \text{(Equation 10)}$$

$$\theta_b = \frac{qa^3 L_{16}}{DC_4} \quad \text{(Equation 11)}$$

$$M_{ra} = -qa^2\left(L_{19} - \frac{C_7}{C_4}L_{16}\right) \quad \text{(Equation 12)}$$

-continued $$Q_a = \frac{-q}{12a}(3a^2 - 2ar_o - r_o^2) \quad \text{(Equation 13)}$$

where $L_{16}$, $L_{13}$, and $L_{19}$ are constant values. Additionally, or alternatively, other equations can be used to determine or verify design parameters of the flow control members.

Further, Equations 14 and 15 can be used to optimize and/or characterize the design of the example fluid apparatus disclosed herein:

$$\phi = \frac{1}{2}\sigma_x y^2 \quad \text{(Equation 14)}$$

$$P = \frac{-E\delta}{(1-v^2)Ma^2}\left[(h-\delta)\left(h-\frac{\delta}{2}\right)t + t^3\right] \quad \text{(Equation 15)}$$

wherein $\phi$ is the stress function, $\sigma_x$ is stress, y is r sin θ, P is total applied load, E is modulus of elasticity, δ is deflection, v is Poisson's ratio, M is a constant as a function of disk-radius per aperture radius, a is disk radius, h is height, and t is thickness. Further, a pressure drop can be approximated using Equation 16 below:

$$\dot{m} = c_d A_o \sqrt{\frac{2g_c}{144}\rho \Delta P} \quad \text{(Equation 16)}$$

wherein $\dot{m}$ is mass flow rate, $c_d$ is the coefficient for equivalent sharp edge orifice diameter (ESEOD), $A_o$ is orifice area, $g_c$ is the gravitational constant, ρ is density, and ΔP is pressure drop.

From the foregoing, it will be appreciated that flexible membrane valves have been disclosed that control the flow of fluid within a fluid apparatus. The examples disclosed herein advantageously use a unitary flow control member to ensure unidirectional flow within the fluid apparatus. In some examples, the flow control member has a curved, conical profile that creates a lower cracking pressure in a desired flow direction and a higher cracking pressure in an undesired flow direction. The example flow control members disclosed herein further include a variable stiffness membrane to allow for operation under a wide range of pressures and a variable thickness along a diameter of the flow control members allows the flow control members to close rapidly regardless of a flow rate of the fluid in the fluid apparatus. Further, in some examples, the flow control members can be placed in series to increase the fault tolerance of the flow control members, increasing reliability of the fluid apparatus.

At least some of the aforementioned examples include one or more features and/or benefits including, but not limited to, the following:

In some examples, a fluid apparatus includes a body defining a fluid flow path between an inlet and an outlet. A flow control member is positioned in the fluid flow path. The flow control member has a base pivotally coupled to an inner wall of the body defining the fluid flow path. The flow control member has an annular tip that is to flex between an open position to allow fluid flow through the fluid flow path and a closed position to prevent fluid flow through the fluid flow path.

In some examples, the base includes a transition to pivotally couple the base to the inner wall.

In some examples, the transition is coupled to a sleeve.

In some examples, the base includes a stop), wherein the stop is to pivot relative to the inner wall when the flow control member moves between the open position and the closed position.

In some examples, the stop is to pivot away from the inner wall when the annular tip moves to the open position and the stop is to pivot toward the inner wall when the annular tip moves to the closed position.

In some examples, the inner wall is to prevent rotation of the stop when the annular tip is in the closed position.

In some examples, the inner wall prevents the annular tip from inverting when the annular tip is in the closed position.

In some examples, the annular tip defines a first diameter when the fluid apparatus is in the open position.

In some examples, a membrane body of the flow control member has a second diameter and the base has a third diameter when the annular tip is in the open position, the first and second diameters being less than the third diameter, the first diameter being greater than the second diameter.

In some examples, the annular tip is coaxially aligned with a longitudinal axis of the fluid flow path when the annular tip is in the open position and when the annular tip is in the closed position.

In some examples, a central body disposed in the fluid flow path. The annular tip seals against the central body to prevent fluid flow through the fluid flow path when the flow control member is in the closed position.

In some examples, a thickness of the flow control member varies between the base and the annular tip.

In some examples, a fluid apparatus including a housing defining a fluid flow path having an inlet and an outlet. A flow control member is positioned in the fluid flow path. The flow control member has a membrane configured to flex between an open position to allow fluid flow across the flow control member and a closed position to at least one of restrict or prevent fluid flow across the flow control member. The membrane is configured to provide an opening that is substantially circular when the membrane is in the open position.

In some examples, the membrane is suspended in the fluid flow path.

In some examples, the membrane is coaxially aligned with a longitudinal axis of the fluid flow path.

In some examples, the membrane has a base pivotally coupled to an inner surface of a sleeve defining the fluid flow path.

In some examples, the sleeve is to engage the housing.

In some examples, the sleeve and the housing are a unitary structure.

In some examples, the flow control member includes a first flow control member and a second flow control member, the first flow control member positioned in the fluid flow path downstream from the second flow control member.

In some examples, the first flow control member, the second flow control member and the housing are formed as a unitary structure In some examples, a flexible membrane positioned in a fluid flow path. The flexible membrane includes a membrane body defining a tip and a base. A sleeve is coupled to the membrane body via the base, the base defining an annular transition to enable the membrane body to pivot relative to the sleeve to move the flexible membrane between an open position to allow fluid flow through the fluid apparatus and a closed position to prevent fluid flow through the fluid apparatus.

In some examples, the flexible membrane has a conical shape.

In some examples, the flexible membrane defines an orifice between the base and the tip of the membrane body when the flexible membrane is in the open position, wherein the tip has a first dimension, the membrane body has a second dimension, and the base has a third dimension, the first dimension being greater than the second dimension, and the third dimension being greater than the first dimension and the second dimension.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A fluid apparatus comprising:
   a body defining a fluid flow path between an inlet and an outlet; and
   a flow control member positioned in the fluid flow path, the flow control member having a base that includes a transition to pivotally couple the base to an inner wall of the body defining the fluid flow path, the flow control member having an annular tip that is to flex between an open position to allow fluid flow through the fluid flow path and a closed position to prevent fluid flow through the fluid flow path, the base including a stop to pivot away from the inner wall when the annular tip moves to the open position and the stop to pivot toward the inner wall when the annular tip moves to the closed position, the flow control member having a unitary, continuous body between the annual tip and the transition when the flow control member is in the open position.

2. The fluid apparatus of claim 1, wherein the transition is coupled to a sleeve.

3. The fluid apparatus of claim 1, wherein the inner wall is to prevent rotation of the stop when the annular tip is in the closed position.

4. The fluid apparatus of claim 1, wherein the inner wall prevents the annular tip from inverting when the annular tip is in the closed position.

5. The fluid apparatus of claim 1, wherein the annular tip defines a first diameter when the fluid apparatus is in the open position.

6. The fluid apparatus of claim 1, wherein the annular tip is coaxially aligned with a longitudinal axis of the fluid flow path when the annular tip is in the open position and when the annular tip is in the closed position.

7. The fluid apparatus of claim 1, further including a central body disposed in the fluid flow path, wherein the annular tip seals against the central body to prevent fluid flow through the fluid flow path when the flow control member is in the closed position.

8. The fluid apparatus of claim 1, wherein a thickness of the flow control member varies between the base and the annular tip.

9. A fluid apparatus comprising:
   a body defining a fluid flow path between an inlet and an outlet; and
   a flow control member positioned in the fluid flow path, the flow control member having:
   a base that includes a transition to pivotally couple the base to an inner wall of the body defining the fluid flow path;

an annular tip that is to flex between an open position to allow fluid flow through the fluid flow path and a closed position to prevent fluid flow through the fluid flow path; and a stop supported by the base that is to pivot away from the inner wall when the annular tip moves to the open position and the stop to pivot toward the inner wall when the annular tip moves to the closed position, wherein the annular tip defines a first diameter when the fluid apparatus is in the open position, and wherein the flow control member includes a membrane body that has a second diameter and the base has a third diameter when the annular tip is in the open position, the first and second diameters being less than the third diameter, the first diameter being greater than the second diameter.

10. A fluid apparatus comprising:
a housing defining a fluid flow path having an inlet and an outlet; and
a flow control member positioned in the fluid flow path, the flow control member having a membrane configured to flex between an open position to allow fluid flow across the flow control member and a closed position to at least one of restrict or prevent fluid flow across the flow control member, the membrane configured to provide an opening that is substantially circular when the membrane is in the open position, the membrane being pivotally coupled to the housing at a pivot positioned between a first end of the membrane and a second end of the membrane opposite the first end, the first end and the second end of the membrane structured to move relative to the housing about the pivot in response to the flow control member moving between the open position and the closed position.

11. The fluid apparatus of claim 10, wherein the membrane is suspended in the fluid flow path.

12. The fluid apparatus of claim 10, wherein the membrane is coaxially aligned with a longitudinal axis of the fluid flow path.

13. The fluid apparatus of claim 10, wherein the membrane has a base pivotally coupled to an inner surface of a sleeve defining the fluid flow path.

14. The fluid apparatus of claim 13, wherein the sleeve is to engage the housing.

15. The fluid apparatus of claim 13, wherein the sleeve and the housing are a unitary structure.

16. The fluid apparatus of claim 10, wherein the flow control member includes a first flow control member and a second flow control member, the first flow control member positioned in the fluid flow path downstream from the second flow control member.

17. The fluid apparatus of claim 16, wherein the first flow control member, the second flow control member and the housing are formed as a unitary structure.

18. The fluid apparatus of claim 10, wherein a portion of the membrane body of the flow control member between the base and an annular tip defines a continuous, arcuate profile when the fluid apparatus is in the open position.

19. The fluid apparatus of claim 18, wherein the annular tip defines a first diameter when the fluid apparatus is in the open position, and the portion of the membrane body has a second diameter and the base has a third diameter when the annular tip is in the open position, the first and second diameters being less than the third diameter, the first diameter being greater than the second diameter.

20. A fluid apparatus comprising:
a flexible membrane positioned in a fluid flow path, the flexible membrane including:
a membrane body defining a tip and a base; and
a sleeve coupled to the membrane body via the base, the base defining an annular transition to enable the membrane body to pivot relative to the sleeve to move the flexible membrane between an open position to allow fluid flow through the fluid apparatus and a closed position to prevent fluid flow through the fluid apparatus, the tip of the membrane configured to compress to form a point when the flexible membrane is in the closed position, wherein the flexible membrane defines an orifice between the base and the tip of the membrane body when the flexible membrane is in the open position, wherein the tip has a first dimension, the membrane body has a second dimension, and the base has a third dimension, the first dimension being greater than the second dimension, and the third dimension being greater than the first dimension and the second dimension.

21. The fluid apparatus of claim 20, wherein the flexible membrane has a conical shape.

* * * * *